(12) United States Patent
Gummadi et al.

(10) Patent No.: US 12,463,766 B2
(45) Date of Patent: Nov. 4, 2025

(54) TECHNIQUES FOR REQUESTING REFERENCE SIGNAL MEASUREMENT GAPS

(71) Applicant: QUALCOMM Incorporated, San Diego, CA (US)

(72) Inventors: Bapineedu Chowdary Gummadi, Hyderabad (IN); Stephen William Edge, Escondido, CA (US); Hanuma Kumar Anumanula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/066,974

(22) Filed: Dec. 15, 2022

(65) Prior Publication Data

US 2024/0204939 A1  Jun. 20, 2024

(51) Int. Cl.
*H04W 72/04* (2023.01)
*H04L 5/00* (2006.01)
*H04W 24/10* (2009.01)
*H04W 76/00* (2018.01)
*H04W 88/08* (2009.01)

(52) U.S. Cl.
CPC ........... *H04L 5/0048* (2013.01); *H04W 24/10* (2013.01)

(58) Field of Classification Search
None
See application file for complete search history.

(56) References Cited

U.S. PATENT DOCUMENTS

| 2019/0075585 A1* | 3/2019 | Deogun | H04B 7/02 |
| 2021/0120513 A1* | 4/2021 | Siomina | H04W 64/00 |
| 2023/0156542 A1* | 5/2023 | Chen | H04L 5/0005 370/331 |

* cited by examiner

*Primary Examiner* — Maharishi V Khirodhar
(74) *Attorney, Agent, or Firm* — Holland & Hart LLP

(57) ABSTRACT

Methods, systems, and devices for wireless communications are described. A user equipment (UE) may receive, from a network entity via a first cell, signaling that indicates a configuration for communicating a reference signal associated with measuring a second cell. The UE may transmit, to the network entity and based on the configuration, a request for a time gap to be included between communications via the first cell and communication of the reference signal. The UE may receive, via the second cell and in response to the request for the time gap, the reference signal in accordance with the time gap. In some examples, the request for the time gap may be communicated via positioning signaling associated with requesting time gaps between the communication of positioning reference signals (PRSs).

24 Claims, 20 Drawing Sheets

TECHNIQUES FOR REQUESTING REFERENCE SIGNAL MEASUREMENT GAPS

FIELD OF TECHNOLOGY

The following relates to wireless communications, including techniques for requesting reference signal measurement gaps.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may perform measurements of reference signals transmitted by a cell different than a serving cell of the UE to determine one or more qualities of the cell. In some examples, the UE may perform such measurements in accordance with time gaps, however, in some cases, the configured time gaps may be insufficient to enable proper measurement of the reference signals. In other cases, the configured time gaps may be excessive in length, which may impact UE performance such as by increasing communication latency.

SUMMARY

The described techniques relate to improved methods, systems, devices, and apparatuses that support techniques for requesting reference signal measurement gaps. For example, the described techniques may enable a user equipment (UE) to request specific time gaps that support the proper measurement of inter-cell reference signals. For instance, a network entity associated with a first cell may indicate to the UE a configuration for communicating a reference signal associated with measuring a second cell, for example, to support determining whether to perform a handover procedure to the second cell. Based on the configuration, the UE may determine a particular time gap that may enable the UE to properly measure the reference signal and may transmit a request to the network entity for the time gap to be included before the communication of the reference signal. In response to the request for the time gap, the UE may receive and measure the reference signal in accordance with the time gap via the second cell (e.g., from a second network entity associated with the second cell).

A method for wireless communication at a UE is described. The method may include receiving, from a network entity via a first cell, signaling that indicates a configuration for communicating a reference signal associated with measuring a second cell, transmitting, to the network entity and based on the configuration, a request for a time gap to be included between communications via the first cell and communication of the reference signal, and receiving, via the second cell and in response to the request for the time gap, the reference signal in accordance with the time gap.

An apparatus for wireless communication at a UE is described. The apparatus may include a processor and a memory coupled with the processor. The memory may include instructions executable by the processor to cause the apparatus to receive, from a network entity via a first cell, signaling that indicates a configuration for communicating a reference signal associated with measuring a second cell, transmit, to the network entity and based on the configuration, a request for a time gap to be included between communications via the first cell and communication of the reference signal, and receive, via the second cell and in response to the request for the time gap, the reference signal in accordance with the time gap.

Another apparatus for wireless communication at a UE is described. The apparatus may include means for receiving, from a network entity via a first cell, signaling that indicates a configuration for communicating a reference signal associated with measuring a second cell, means for transmitting, to the network entity and based on the configuration, a request for a time gap to be included between communications via the first cell and communication of the reference signal, and means for receiving, via the second cell and in response to the request for the time gap, the reference signal in accordance with the time gap.

A non-transitory computer-readable medium storing code for wireless communication at a UE is described. The code may include instructions executable by a processor to receive, from a network entity via a first cell, signaling that indicates a configuration for communicating a reference signal associated with measuring a second cell, transmit, to the network entity and based on the configuration, a request for a time gap to be included between communications via the first cell and communication of the reference signal, and receive, via the second cell and in response to the request for the time gap, the reference signal in accordance with the time gap.

In some examples of the method, apparatuses, and non-transitory computer-readable medium described herein, transmitting the request for the time gap may include operations, features, means, or instructions for transmitting the request for the time gap via positioning signaling associated with requesting time gaps between communication of positioning reference signals via inter-frequency cells, intra-frequency cells, inter-radio access technology (RAT) cells, or a combination thereof.

Some examples of the method, apparatuses, and non-transitory computer-readable medium described herein may further include operations, features, means, or instructions for transmitting, to the network entity via the first cell, a capability message indicating for the exclusion of a respective time gap before communication of respective reference signals associated with measuring the second cell, where the configuration for communicating the reference signal excludes a configuration for the time gap based on the capability message.

Some examples of the method, apparatuses, and non-transitory computer-readable medium described herein may further include operations, features, means, or instructions for determining to request the inclusion of the time gap based on one or more timing parameters included in the configuration for communicating the reference signal, where the request for the time gap may be transmitted based on the determination and the exclusion of the configuration for the time gap.

Some examples of the method, apparatuses, and non-transitory computer-readable medium described herein may further include operations, features, means, or instructions for transmitting, to the network entity via the first cell, a capability message indicating for the inclusion of a respective time gap before communication of respective reference signals associated with measuring the second cell, where the configuration for communicating the reference signal includes a configuration for a second time gap between the communications via the first cell and the communication of the reference signal based on the capability message and determining that the second time gap may be insufficient to enable the UE to measure the reference signal, where the request for the time gap may be transmitted based on the determination.

In some examples of the method, apparatuses, and non-transitory computer-readable medium described herein, the time gap may be included between the communications via the first cell and the communication of the reference signal in addition to the second time gap. In some examples of the method, apparatuses, and non-transitory computer-readable medium described herein, the time gap may be included between the communications via the first cell and the communication of the reference signal instead of the second time gap.

Some examples of the method, apparatuses, and non-transitory computer-readable medium described herein may further include operations, features, means, or instructions for tuning, during the time gap, a radio frequency (RF) chain of the UE from a first frequency associated with the first cell to a second frequency associated with the second cell, from a first RAT associated with the first cell to a second RAT associated with the second cell, or both, where the reference signal may be received via the second cell based on the tuning.

In some examples of the method, apparatuses, and non-transitory computer-readable medium described herein, the request for the time gap includes a duration of the time gap, a periodicity of the time gap, a time offset relative to a starting slot of a transmission time interval via which the reference signal may be received, or a combination thereof.

Some examples of the method, apparatuses, and non-transitory computer-readable medium described herein may further include operations, features, means, or instructions for receiving, via the second cell and based on the periodicity of the time gap, a second reference signal associated with measuring the second cell in accordance with the time gap.

In some examples of the method, apparatuses, and non-transitory computer-readable medium described herein, the request for the time gap indicates a periodicity of the time gap for inclusion between subsequent communications via the first cell and communication of subsequent reference signals associated with measuring the second cell and the method, apparatuses, and non-transitory computer-readable medium may include further operations, features, means, or instructions for transmitting, to the network entity via the first cell, a second request to disable the inclusion of the time gap in accordance with the indicated periodicity.

Some examples of the method, apparatuses, and non-transitory computer-readable medium described herein may further include operations, features, means, or instructions for determining that the network entity supports a positioning procedure associated with the UE, where the request for the time gap may be transmitted to the network entity based on the determination.

In some examples of the method, apparatuses, and non-transitory computer-readable medium described herein, the configuration for communicating the reference signal includes a configuration of a second time gap and the request for the time gap may be transmitted based on a duration of the second time gap being greater than a duration for the UE to tune an RF chain from the first cell to the second cell, a duration of the time gap being less than the duration of the second time gap.

In some examples of the method, apparatuses, and non-transitory computer-readable medium described herein, the first cell may be associated with a first frequency and the second cell may be associated with a second frequency and the request for the time gap may be transmitted based on the first frequency and the second frequency being different.

In some examples of the method, apparatuses, and non-transitory computer-readable medium described herein, the first cell may be associated with a first RAT and the second cell may be associated with a second RAT and the request for the time gap may be transmitted based on the first RAT and the second RAT being different.

A method for wireless communication at a network entity is described. The method may include outputting, via a first cell, signaling that indicates a configuration for communicating a reference signal associated with measurement of a second cell by a UE and obtaining, based on the configuration, a request for a time gap to be included between communications via the first cell and communication of the reference signal, where the reference signal is communicated via the second cell in accordance with the time gap in response to the request for the time gap.

An apparatus for wireless communication at a network entity is described. The apparatus may include a processor and a memory coupled with the processor. The memory may include instructions executable by the processor to cause the apparatus to output, via a first cell, signal that indicates a configuration for communicating a reference signal associated with measurement of a second cell by a UE and obtain, based at least in part on the configuration, a request for a time gap to be included between communications via the first cell and communication of the reference signal, where the reference signal is communicated via the second cell in accordance with the time gap in response to the request for the time gap.

Another apparatus for wireless communication at a network entity is described. The apparatus may include means for outputting, via a first cell, signaling that indicates a configuration for communicating a reference signal associated with measurement of a second cell by a UE and means for obtaining, based on the configuration, a request for a time gap to be included between communications via the first cell and communication of the reference signal, where the reference signal is communicated via the second cell in accordance with the time gap in response to the request for the time gap.

A non-transitory computer-readable medium storing code for wireless communication at a network entity is described. The code may include instructions executable by a processor to outputting, via a first cell, signal that indicates a configuration for communicating a reference signal associated with measurement of a second cell by a UE and obtaining, base at least in part on the configuration, a request for a time gap to be included between communications via the first cell and communication of the reference signal, where the reference signal is communicated via the second cell in accordance with the time gap in response to the request for the time gap.

In some examples of the method, apparatuses, and non-transitory computer-readable medium described herein, obtaining the request for the time gap may include operations, features, means, or instructions for obtaining the request for the time gap via positioning signaling associated with requesting time gaps between communication of positioning reference signals via inter-frequency cells, intra-frequency cells, inter-RAT cells, or a combination thereof.

Some examples of the method, apparatuses, and non-transitory computer-readable medium described herein may further include operations, features, means, or instructions for obtaining, via the first cell, a capability message associated with the UE that indicates for the exclusion of a respective time gap before communication of respective reference signals associated with measuring the second cell, where the configuration for communicating the reference signal excludes a configuration for the time gap based on the capability message.

In some examples of the method, apparatuses, and non-transitory computer-readable medium described herein, the request for the time gap may be obtained based on one or more timing parameters included in the configuration for communicating the reference signal and the exclusion of the configuration for the time gap.

Some examples of the method, apparatuses, and non-transitory computer-readable medium described herein may further include operations, features, means, or instructions for obtaining, via the first cell, a capability message associated with the UE that indicates for the inclusion of a respective time gap before communication of respective reference signals associated with measuring the second cell, where the configuration for communicating the reference signal includes a configuration for a second time gap between the communications via the first cell and the communication of the reference signal based on the capability message, and where the request for the time gap may be obtained based on the second time gap being insufficient to enable the UE to measure the reference signal.

In some examples of the method, apparatuses, and non-transitory computer-readable medium described herein, the time gap may be included between the communications via the first cell and the communication of the reference signal in addition to the second time gap. In some examples of the method, apparatuses, and non-transitory computer-readable medium described herein, the time gap may be included between the communications via the first cell and the communication of the reference signal instead of the second time gap.

In some examples of the method, apparatuses, and non-transitory computer-readable medium described herein, the request for the time gap includes a duration of the time gap, a periodicity of the time gap, a time offset relative to a starting slot of a transmission time interval via which the reference signal may be output, or a combination thereof.

In some examples of the method, apparatuses, and non-transitory computer-readable medium described herein, the request for the time gap indicates a periodicity of the time gap for inclusion between subsequent communications via the first cell and communication of subsequent reference signals associated with measuring the second cell and the method, apparatuses, and non-transitory computer-readable medium may include further operations, features, means, or instructions for obtaining, via the first cell, a second request to disable the inclusion of the time gap in accordance with the indicated periodicity.

In some examples of the method, apparatuses, and non-transitory computer-readable medium described herein, the request for the time gap may be obtained based on the network entity supporting a positioning procedure associated with the UE.

In some examples of the method, apparatuses, and non-transitory computer-readable medium described herein, the configuration for communicating the reference signal includes a configuration of a second time gap and the request for the time gap may be obtained based on a duration of the second time gap being greater than a duration for the UE to tune an RF chain from the first cell to the second cell, a duration of the time gap being less than the duration of the second time gap.

In some examples of the method, apparatuses, and non-transitory computer-readable medium described herein, the first cell may be associated with a first frequency and the second cell may be associated with a second frequency and the request for the time gap may be obtained based on the first frequency and the second frequency being different.

In some examples of the method, apparatuses, and non-transitory computer-readable medium described herein, the first cell may be associated with a first RAT and the second cell may be associated with a second RAT and the request for the time gap may be obtained based on the first RAT and the second RAT being different.

DETAILED DESCRIPTION

Figure 1:
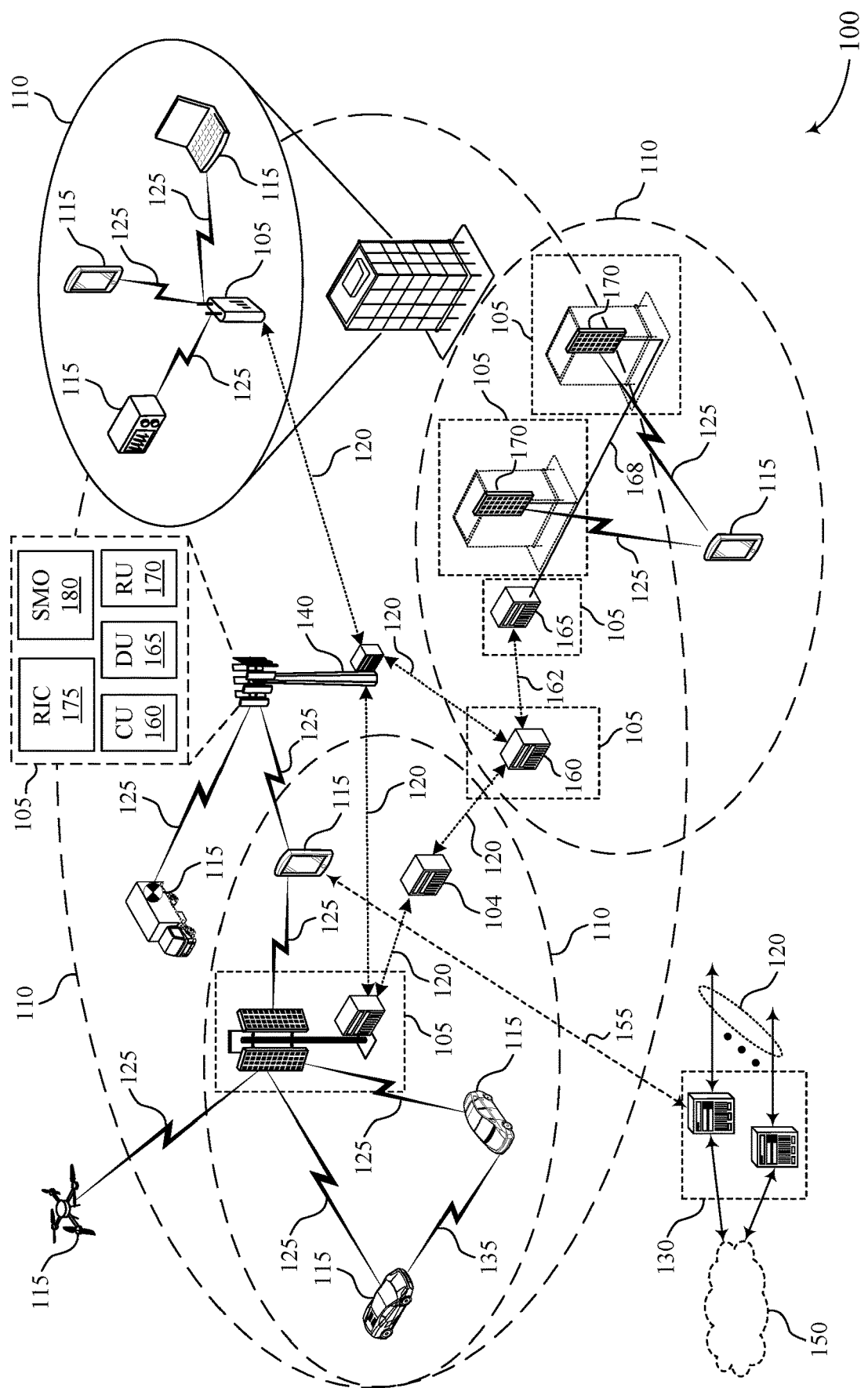
FIGS. 1 and 2 illustrate examples of wireless communications systems that support techniques for requesting reference signal measurement gaps in accordance with one or more aspects of the present disclosure.

In some wireless communications systems, a user equipment (UE) may communicate with a network entity via a serving cell associated with (e.g., served by) the network entity. The network entity may indicate for the UE to measure inter-cell reference signals (e.g., perform inter-frequency, intra-frequency, or inter-radio-access-technology (RAT) measurements on reference signals communicated via a different serving cell). For example, the UE may measure reference signals received via a second cell to determine characteristics of the second cell, which may support determining whether to perform a handover procedure to the second cell, among other operations. To perform such measurements, the UE may utilize time gaps (e.g., measurement gaps, delays in time) during which the UE may tune one or more radio frequency (RF) components (e.g., one or more RF chains) from communicating via the serving cell and communicating via the second cell in order to receive the reference signal via the second cell.

In some examples, the UE may transmit a capability message that generally indicates whether the network entity should configure the UE with time gaps if measuring inter-cell reference signals. However, the time gaps configured by the network entity may be insufficient for the UE to perform the configured measurements, which may result in call loss or radio link failure, among other issues. In other examples, the time gaps configured by the network entity may be excessively long or excessive in quantity which may lead to reduced UE performance, such as timing delays in communication and increased communication latency.

In accordance with examples described herein, the UE may dynamically request specific time gaps for measuring inter-cell reference signals. For example, upon receiving a configuration from the network entity to perform measurements, the UE may determine and request specific time gaps that enable the UE to properly perform the measurements. The UE may communicate with the network entity to dynamically enable (e.g., start, activate) and disable (e.g., stop, deactivate) the gaps in association with performing the measurements. In some examples, to transmit the request, the UE may utilize gap request signaling associated with performing a positioning session with the network entity. For example, as part of a positioning session, the UE may transmit a gap request (e.g., via a LocationMeaurementIndication or a InterFreqRSTDMeasurementIndication) to request specific time gaps between the transmission of inter-frequency positioning reference signals (PRSs) such that the UE may properly measure the PRSs.

By requesting specific time gaps, a UE may support efficient and proper measurement of inter-cell reference signals. For example, dynamically requested time gaps by the UE may be sufficiently long to enable the UE to properly tune RF components and receive an inter-cell reference signal. The requested time gaps may also be selected (e.g., tuned) to avoid being excessively long such that resource waste, timing delays, and communication latency may be reduced. Thus, the dynamic requesting of specific time gaps for inter-cell reference signal measurement may support efficient handover between a first cell and a second cell without service interruptions. In cases of excessive time gaps, requesting specific time gaps may also reduce UE power consumption and improve efficiency of communications with a wireless network. In cases of insufficient time gaps, requesting specific time gaps may reduce radio link failures or call drops caused by a UE being unable to perform inter-cell measurements properly.

Aspects of the disclosure are initially described in the context of wireless communications systems. Aspects of the disclosure are additionally described with reference to process flows. Aspects of the disclosure are further illustrated by and described with reference to apparatus diagrams, system diagrams, and flowcharts that relate to techniques for requesting reference signal measurement gaps.

FIG. 1 illustrates an example of a wireless communications system 100 that supports techniques for requesting reference signal measurement gaps in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for requesting reference signal measurement gaps as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $Ts=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM)

techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with examples described herein, a UE 115 in the wireless communications system 100 may receive, from a network entity 105 via a first cell, signaling that indicates a configuration for an inter-cell reference signal. For example, the signaling may indicate a configuration, such as a resource allocation, used to communicate a reference signal associated with measuring a second cell. The UE 115 may transmit, to the network entity 105 and based on the configuration, a request for a time gap to be included before the communication of the reference signal (e.g., between communications via the first cell and communication of the reference signal). That is, based on the configuration, the UE 115 may request a specific time gap for inclusion before the communication of the reference signal that will enable the UE 115 to properly tune to the second cell and measure the reference signal. Accordingly, in response to the request for the time gap, the UE 115 may receive, via the second cell, the reference signal in accordance with the time gap.

Figure 2:
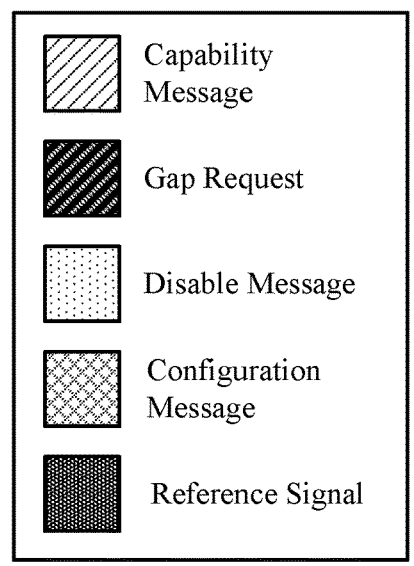
Figure 2:
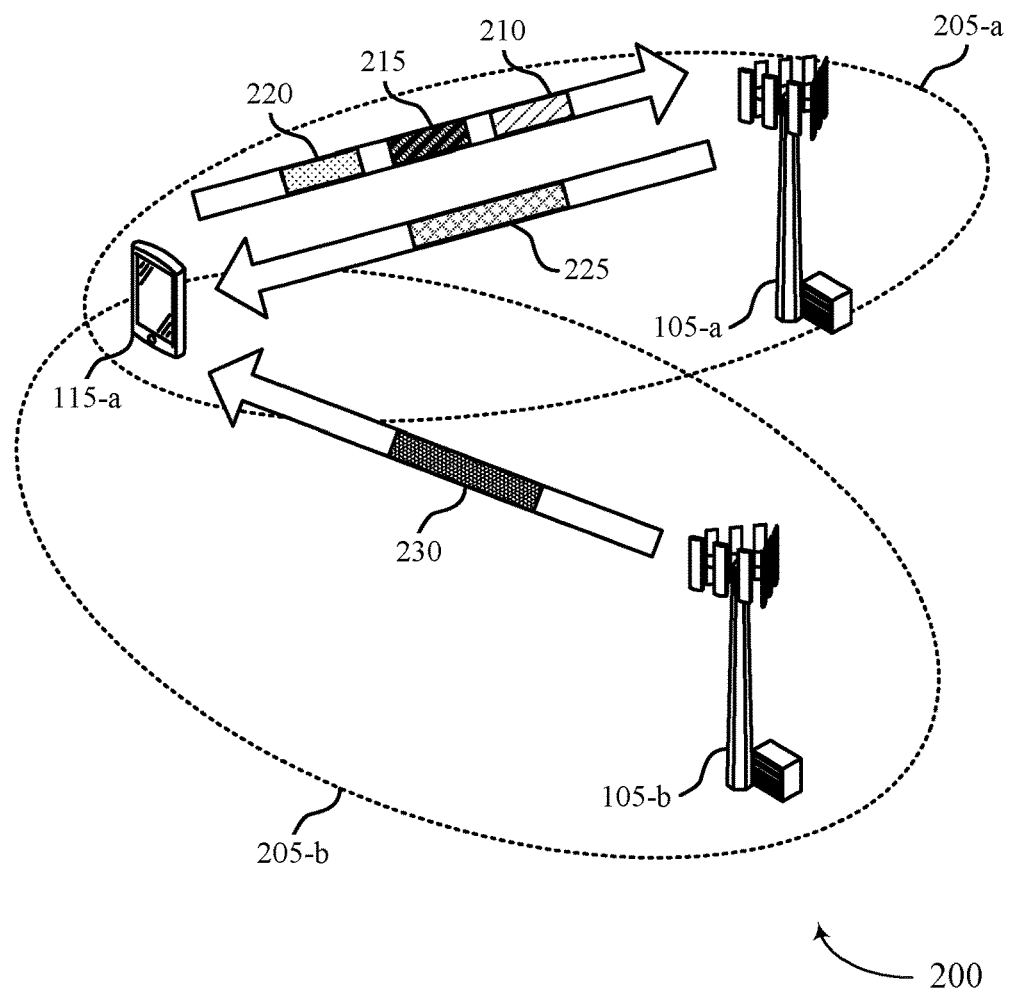

FIG. 2 illustrates an example of a wireless communications system 200 that supports techniques for requesting reference signal measurement gaps in accordance with one or more aspects of the present disclosure. The wireless communications system 200 may implement or may be implemented by aspects of wireless communications system 100. For example, the wireless communications system 200 may include a UE 115-a, a network entity 105-a, and a network entity 105-b, which may be examples of corresponding devices described with reference to FIG. 1.

The wireless communications system 200 may support the communication of inter-cell reference signals, for example, to support a handover procedure between cells 205. For example, the network entity 105-a may communicate with the UE 105-a via a cell 205-a served by the network entity 105-a. In some examples, the UE 115 may perform a handover procedure to switch to communicate with the network entity 105-b via a cell 205-b served by the network entity 105-b. To support the handover procedure, the UE 115-a may receive and measure one or more reference signals transmitted via the second cell (e.g., by the network entity 105-b) to determine one or more communication characteristics of the second cell. For example, the UE 115-a may measure the one or more reference signals to determine communication characteristics, such as channel state information (CSI) or signal quality associated the cell 205-b, among other communication characteristics, which may enable the UE 115-a to determine whether to perform the handover procedure to communicate via the cell 205-b (e.g., if the communication characteristics of the cell 205-b are better relative to communication characteristics of the cell 205-a, among other triggering conditions) or remain camped on the cell 205-a.

In some examples, the cell 205-b may be an inter-frequency cell, an intra-frequency cell, or an inter-RAT cell relative to the cell 205-a. For example, the cell 205-a may be associated with a first frequency band (e.g., a first frequency range), and the cell 205-b may be associated with a second frequency band (e.g., a second frequency range) different than the first frequency band (e.g., but which may be partially overlapping or non-overlapping). That is, messages communicated via the cell 205-a may be communicated within the first frequency band, and messages communicated via the cell 205-b may be communicated within the second frequency band. Here, the cells 205-a and 205-b may be considered inter-frequency cells. In some examples, the cell 205-a and the cell 205-b may be associated with a same frequency band. Here the cells 205-a and 205-b may be considered intra-frequency cells. In some examples, the cell 205-a may be associated with a first RAT, and the cell 205-b may be associated with a second RAT different than the first RAT. Here, the cells 205-a and 205-b may be considered inter-RAT cells. In some examples, the cells 205-a and 205-b may be both inter-frequency and inter-RAT cells or both intra-frequency and inter-RAT cells.

To support handover between inter-frequency cells, inter-RAT cells, or intra-frequency cells, a time gap may be implemented to provide the UE 115-a with sufficient time to tune the UE 115-a's RF circuitry to support proper measurement of a reference signal 230 communicated via the cell 205-b, which may be referred to as an inter-cell reference signal (e.g., based on being communicated via a different cell 205 than a current cell 205 on which the UE 115-a is camped). For example, the UE 115-a may tune one or more RF components (e.g., an RF chain) from the cell 205-a to the cell 205-b to receive and measure the reference signal 230, for example, in accordance with the frequency or RAT associated with the cell 205-b. In some examples, a time gap may be implemented if the cell 205-b is an intra-frequency cell, for example, if the reference signal 230 is transmitted via a different portion of the same frequency band such that tuning is performed to measure the reference signal 230.

In some examples, the UE 115-a may transmit a capability message 210 to the network entity 105-a via the cell 205-a to support the implementation of time gaps in communicating inter-cell reference signals. The capability message 210 may include a capability of the UE 115-a. For example, the capability message 210 may include an indication of whether the UE utilizes a time gap for inter-cell reference signal measurements (e.g., inter-frequency, intra-frequency, or inter-RAT measurements). The capability message 210 may include a request for the time gap or a request to exclude the time gap based on the capability of the UE 115-a. If requesting the time gap, the capability message 210 may not include a request for a specific time gap, but the request may instead be a general request for the inclusion of a time gap that is configured by the network entity 105-*a* as different time gaps may be used in different measurement scenarios.

To support the communication of inter-cell reference signals, the network entity 105-*a* may transmit a configuration message 225 to the UE 115-*a*. The configuration message 225 may configure the UE 115-*a* with inter-cell reference signal measurements. For example, the configuration message 225 may include signaling that indicates for the UE 115-*a* to measure one or more reference signals (e.g., one or more reference signals 230) transmitted via a different cell than the cell 205-*a* (e.g., the cell 205-*b*) and may indicate a configuration (e.g., a resource allocation) for the UE 115-*a* to receive the one or more reference signals. In some examples, the configuration message 225 may include or exclude a configuration for a time gap associated with the measurement of the reference signal 230 in accordance with the capability message 210.

In some examples, time gaps configured by the network entity 105-*a* may be excessive in length or quantity, which may adversely impact performance of the UE 115-*a*. In some cases, the UE 115-*a* may perform various optimizations. For example, the UE 115-*a* may ignore (e.g., refrain from) performing some inter-cell reference signal measurements which may result in the UE 115-*a* using fewer time gaps. In some cases, the UE 115-*a* may ignore performing some inter-cell reference signal measurements where the UE 115-*a* is stationary or lacks mobility. In some cases, the UE 115-*a* may ignore performing some inter-cell reference signal measurements where the UE 115-*a* has an intra-frequency or intra-RAT cell 205 neighboring UE (e.g., for which time gap implementation is unnecessary). In other examples, the UE 115-*a* may have one or more additional RF chains (e.g., based on a dual subscriber-identity-module (SIM) dual access (DSDA) capability of the UE 115-*a*) that may be independently tuned and operated. The availability of additional RF chains may be dynamic and may be based on a state of a second subscription of the UE 115-*a*. In examples in which the UE 115-*a* has an additional RF chain available, the UE 115-*a* may be able to perform inter-cell measurements using the additional RF chain without RF retuning, and the UE 115-*a* may use less time gaps. That is, there may be various communication scenarios in which a time gap configured by the network entity 105-*a* is excessive or unnecessary, which may result in wasted resources, increased time delays, or increased latency, among other issues.

In some other examples, time gaps configured by the network entity 105-*a* may be insufficient in length or in quantity. In such examples, the UE 115-*a* may be unable to perform inter-cell reference signal measurements as expected. As a result, the UE 115-*a* may fail to send a measurement report or may send a measurement report including inaccurate measurements corresponding to a given inter-cell reference signal based on failing to properly perform the inter-cell reference signal measurement. The inability of the UE 115-*a* to perform proper inter-cell reference signal measurements may result in call drops, radio link failure, or other negative performance results.

To support proper and efficient measurement of inter-cell reference signals, the UE 115-*a* may dynamically request, via a gap request 215, a time gap for inclusion before an inter-cell reference signal is communicated. For example, based on the configuration message 225, the UE 115-*a* may determine that a first time gap indicated by the configuration message 225 is insufficient (e.g., or excessive) to measure a reference signal 230. Accordingly, the UE 115-*a* may determine a second time gap (e.g., in addition to or instead of the first time gap) and transmit the gap request 215 to the network entity 105-*a* that requests for the inclusion of the second time gap in association with the communication of the reference signal 230. Alternatively, the configuration message 225 may exclude a configuration for a time gap (e.g., in accordance with the capability message 210), and the UE 115-*a* may determine a time gap that enables the UE 115-*a* to properly measure the reference signal 230 (e.g., based on the resource allocation of the reference signal 230). Accordingly, the UE 115-*a* may transmit the gap request 215 to the network entity 105-*a* that requests for the inclusion of the determined time gap in association with the communication of the reference signal 230.

The UE 115-*a* may indicate to the network entity 105-*a* to start time gaps (e.g., via gap request 215) and stop time gaps (e.g., via disable message 220) dynamically. For example, the communication of the reference signal 230, and thus the inclusion of the indicated time gap, may be periodic. The gap request 215 may activate the inclusion of a requested time gap between communicating via the cell 205-*a* and receiving the reference signal 230 via the cell 205-*b* such that tuning may be performed. While the inclusion of the time gap remains activated, additional reference signals 230 may be communicated in accordance with a configured periodicity (e.g., included in the configuration message 225) and the requested time gap. The UE 115-*a* may transmit the disable message 220 to deactivate the inclusion of the request time gap in association with the communication of inter-cell reference signals (e.g., the reference signal 230).

In some examples, the UE 115-*a* may utilize a measurement gaps request associated with positioning measurements (e.g., reference signal time difference (RSTD) measurements) to request for the inclusion of the time gap. For example, the UE 115-*a* may support a positioning session (e.g., a positioning procedure) in which PRSs may be received via one or more cells 205 (e.g., from one or more network entities 105) such that a location of the UE 115-*a* may be determined. When a positioning session is triggered, a location server (LS) may configure PRSs to be transmitted (e.g., broadcasted) by the one or more network entities 105 (e.g., the network entity 105-*a*, the network entity 105-*b*) to the UE 115-*a* (e.g., according to an LTE positioning protocol (LPP) or an NR positioning protocol (NRPP).

The LS may indicate to the UE 115-*a* a configuration (e.g., LPP assistance information, NRPP assistance information) for measuring the PRSs. The network entity 105-*a* may be unaware of the indicated configuration (e.g., the configuration may be transparent to the network entity 105-*a*), or the network entity 105-*a* may be unaware which UEs 115 are participating in a positioning session and measuring PRSs. As part of the positioning session, the UE 115-*a* may transmit positioning signaling (e.g., a LocationMeasurementIndication, a InterFreqRSTDMeasurementIndication) to the network entity 105-*a* that requests for the inclusion of a time gap in association with the communication of inter-cell PRSs (e.g., PRSs communicated via cells 205 different than the cell 205-*a*).

In some examples, the gap request 215 may be communicated using the positioning signaling. That is, the UE 115-*a* may transmit the positioning signaling used to request a time gap in association with a positioning session to request for the inclusion of a time in association with the communication of an inter-cell reference signal. In some cases, the gap request 215 communicated using the positioning signaling may apply to communication of both PRSs and inter-cell reference signals (e.g., from network entity 105-*b*). In other cases, the gap request 215 communicated using the positioning signaling may be transmitted outside of a positioning session, and the gap request 215 may apply to communication of inter-cell reference signals.

In some examples, the UE 115-*a* may transmit the gap request 215 to the network entity 105-*a* based on determining that the network entity 105-*a* may participate in a positioning session (e.g., that the network entity 105-*a* may transmit a PRS as part of a positioning session). For example, the UE 115-*a* may receive a broadcasted positioning system information block (SIB) from the network entity 105-*a*, which may indicate that the network entity 105-*a* may participate in the positioning session. In other examples, the UE 115-*a* may transmit a request (e.g., a one-time process request) for positioning SIBs and non-positioning SIBs from the network entity 105-*a* and may log (e.g., store) a positioning capability of the network entity 105-*a* in a database of the UE 115-*a* based on whether the network entity 105-*a* transmits a positioning SIB to the UE 115-*a*. In still other examples, the UE 115-*a* may determine that a positioning session in which the network entity 105-*a* participated was performed previously.

The UE 115-*a* may request a time gap with a specific duration, periodicity, offset, or combination thereof. For example, the gap request 215 may include an indication of a duration of the time gap, a periodicity of the time gap, a time offset relative to a starting slot of a time interval (e.g., a TTI) via which the reference signal 230 is received, or a combination thereof. In some examples, the UE 115-*a* may utilize fields of the positioning signaling in which time gap duration, periodicity, time offset, or a combination thereof, may be specified in order to indicate the specific duration, periodicity, time offset, or combination thereof.

Figure 3:
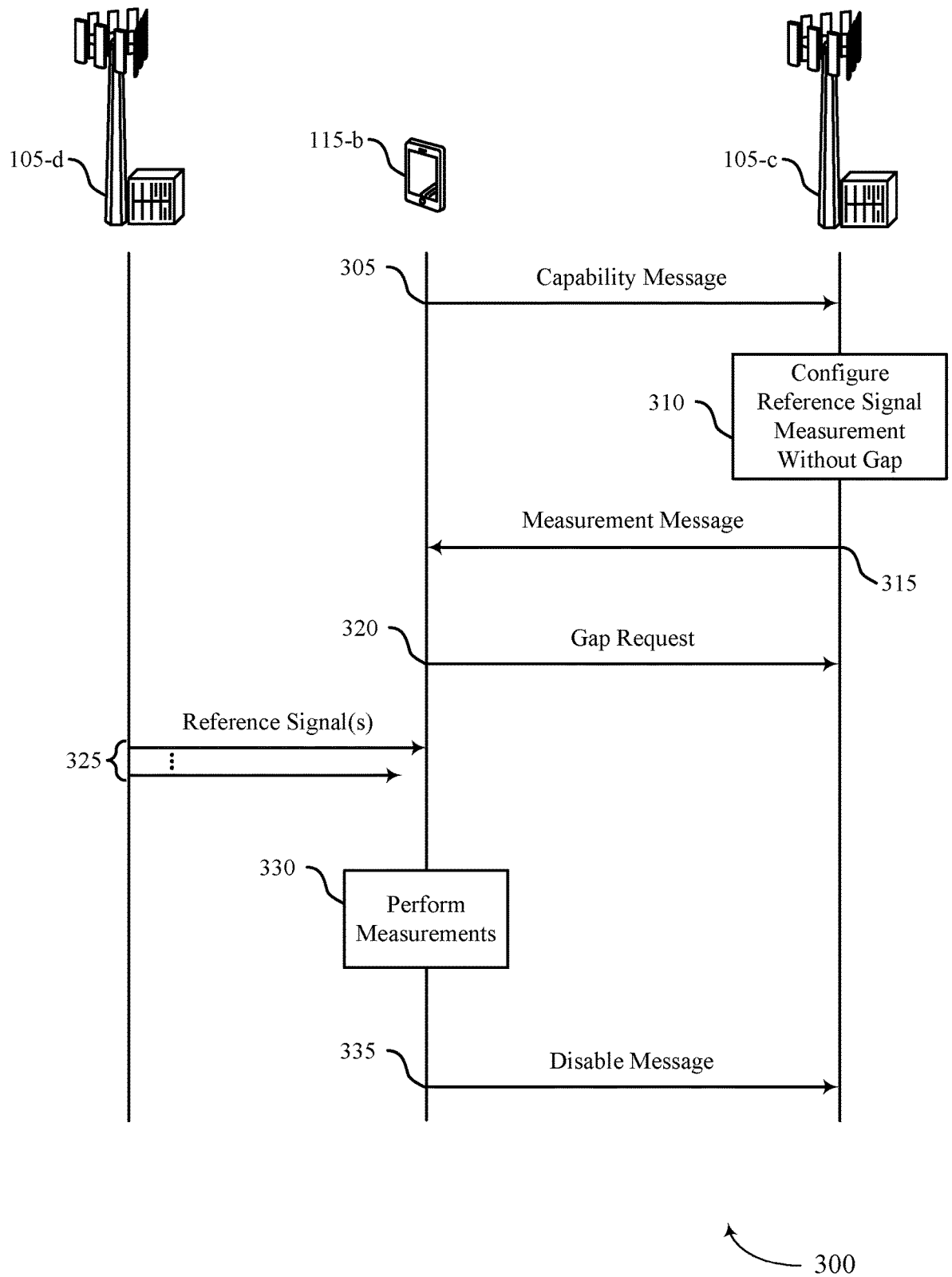
FIGS. 3 and 4 illustrate examples of process flows that support techniques for requesting reference signal measurement gaps in accordance with one or more aspects of the present disclosure.

FIG. 3 illustrates an example of a process flow 300 that supports techniques for requesting reference signal measurement gaps in accordance with one or more aspects of the present disclosure. The process flow 300 may implement or may be implemented by aspects of wireless communications system 100 or the wireless communication system 200. For example, the process flow 300 may include a UE 115-*b*, a network entity 105-*c*, and a network entity 105-*d*, which may be examples of corresponding devices described with reference to FIGS. 1 and 2. In the following description of the process flow 300, operations between the UE 115-*b*, the network entity 105-*c*, and the network entity 105-*d* may be added, omitted, or performed in a different order (with respect to the exemplary order shown). Further, although some operations or signaling may be shown to occur at different times for discussion purposes, these operations may actually occur at the same time.

At 305, the UE 115-*b* may transmit a capability message to the network entity 105-*c* that indicates a capability of the UE 115-*b* for inter-cell reference signal measurements. For example, the UE 115-*b* may communicate with the network entity 105-*c* via a first cell. Via the capability message, the UE 115-*b* may indicate for the exclusion of a respective time gap before communication of respective reference signals associated with measuring a second cell via which the UE 115-*b* may communicate with the network entity 105-*d*. In some examples, the UE 115-*b* may indicate for the exclusion of the respective time gap based on a capability of the UE 115-*b* to request specific time gaps in association with communicating inter-cell reference signals. For example, because the UE 115-*b* may subsequently request for the inclusion of a specific time gap (e.g., having a specific duration, periodicity, time offset, or combination thereof), the UE 115-*b* may indicate for the exclusion of the respective time gap in the capability message to prevent the network entity 105-*c* from configuring the respective time gap.

At 310, the network entity 105-*c* may configure one or more reference signal measurements for the UE 115-*b* associated with measuring the second cell without the inclusion of the respective time gap, in accordance with the capability message.

At 315, the network entity 105-*c* may transmit, via a first cell, a measurement message (e.g., via RRC signaling) that indicates a configuration for the one or more reference signal measurements. For example, the configuration may include a resource allocation, including timing parameters (e.g., time resources, a periodicity, a time offset, among others) for communicating one or more inter-cell reference signals to the UE 115-*b* associated with measuring the second cell (e.g., for receiving the one or more inter-cell reference signals from the network entity 105-*d* via the second cell).

At 320, the UE 115-*b* may request a time gap to be included between communications via the first cell and communication of the one or more inter-cell reference signals. The request for the time gap may be based on the one or more timing parameters included in the configuration for communicating the one or more inter-cell reference signals. For example, the UE 115-*b* may use the timing parameters included in the configuration to determine a time gap that will enable the UE 115-*b* to properly measure the one or more inter-cell reference signals via the second cell. The request for the time gap may include a duration of the time gap, a periodicity of the time gap, or a time offset relative to a starting slot of a time interval via which the one or more inter-cell reference signals are received. In some examples, the request for the time gap may be transmitted to the network entity 105-*c* via positioning signaling (e.g., a LocationMeasurementIndication, a InterFreqRSTDMeasurementIndication) associated with requesting time gaps between communication of PRSs.

The request for the time gap may be based on the second cell operating in a different frequency or RAT than the first cell. For example, the first cell may be associated with a first frequency band and the second cell may be associated with a second frequency band. During the time gap, the UE 115-*b* may tune an RF chain of the UE 115-*b* from the first cell to the second cell. For example, the UE 115-*b* may tune the RF chain from a first frequency associated with the first cell (e.g., within the first frequency band) to a second frequency associated with the second cell (e.g., within the second frequency band). Additionally or alternatively, the first cell may be associated with a first RAT and the second cell may be associated with a second RAT. During the time gap, the UE 115-*b* may tune one or more RF components of the UE 115-*b* (e.g., the RF chain) from communicating according to the first RAT to communicating according to the second RAT. In some examples, the first cell and the second cell may be intra-frequency cells, but the inter-cell reference signals may be communicated via different portions of a same frequency band such that tuning the RF chain is performed to properly receive the inter-cell reference signals.

At 325, the network entity 105-*d* may transmit the one or more inter-cell reference signals to the UE 115-*b*. The network entity 105-*d* may transmit the one or more inter-cell reference signals in accordance with the time gap requested by the UE 115-*b*. That is, the network entity 105-*d* may transmit the one or more inter-cell reference signals after the time gap such that the UE 115-*b* may properly receive the one or more inter-cell reference signals. In some examples, the network entity 105-*d* may transmit the one or more inter-cell reference signals in accordance with a configured periodicity (e.g., included in the measurement message). That is, the network entity 105-*d* may transmit a first inter-cell reference signal in accordance with the time gap, a second inter-cell reference signal in accordance with the periodicity and the time gap, and so on.

At 330, the UE 115-*b* may perform measurements of the reference signals to determine one or more communication characteristics associated with the second cell, which may enable the UE 115-*b* to determine whether to perform a handover procedure to the second cell. The UE 115-*b* may perform measurements of the reference signals in association with tuning an RF chain of the UE 115-*b* from the first cell to the second cell.

At 335, upon completing measurements of the reference signals, the UE 115-*b* may request for the network entity 105-*d* to disable the time gap. For example, the UE 115-*b* may transmit a disable message that requests to disable the inclusion of the time gap in accordance with the periodicity indicated in the request for the time gap. The UE 115-*b* may signal to the network entity 105-*d* to disable time gaps via positioning signaling (e.g., LocationMeasurementIndication, InterFreqRSTDMeasurementIndication).

Figure 4:
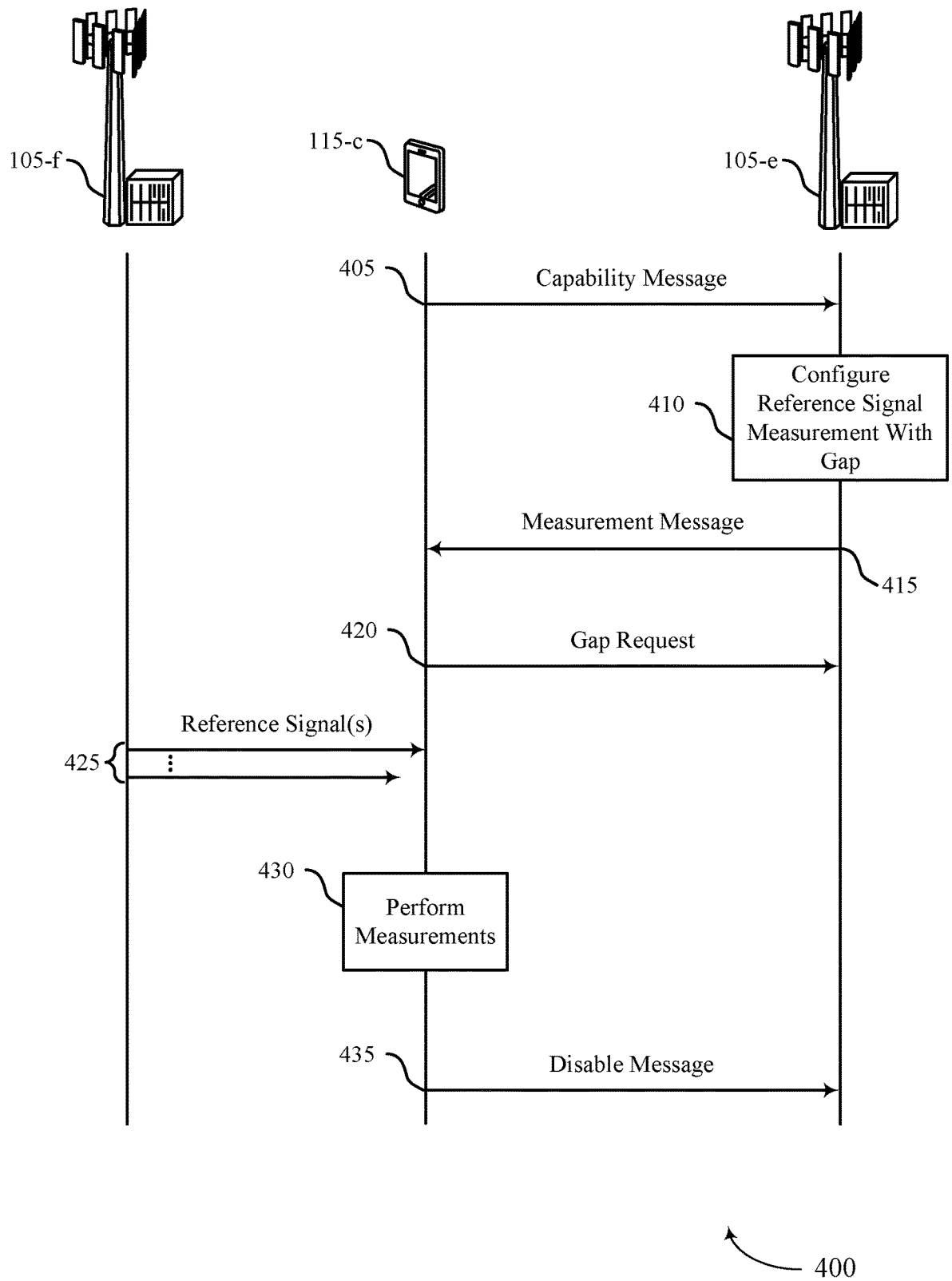

FIG. 4 illustrates an example of a process flow 400 that supports techniques for requesting reference signal measurement gaps in accordance with one or more aspects of the present disclosure. The process flow 400 may implement or may be implemented by aspects of any of the wireless communications systems or process flows described with reference to FIGS. 1 through 3. For example, the process flow 400 may include a UE 115-*c*, a network entity 105-*e*, and a network entity 105-*f*, which may be examples of corresponding devices described with reference to FIGS. 1 through 3. In the following description of the process flow 400, operations between the UE 115-*c*, the network entity 105-*e*, and the network entity 105-*f* may be added, omitted, or performed in a different order (with respect to the exemplary order shown). Further, although some operations or signaling may be shown to occur at different times for discussion purposes, these operations may actually occur at the same time.

At 405, the UE 115-*c* may transmit a capability message to the network entity 105-*e* that indicates a capability of the UE 115-*c* for inter-cell reference signal measurements. For example, the UE 115-*c* may communicate with the network entity 105-*e* via a first cell. Via the capability message, the UE 115-*c* may indicate for the inclusion of a respective time gap before communication of respective reference signals associated with measuring a second cell via which the UE 115-*c* may communicate with the network entity 105-*e*. In some examples, the capability message may indicate for the inclusion of a general time gap. That is, the capability message may not specify any particular parameters of the respective time gap, but instead indicate for the network entity 105-*e* to configure the respective time gap.

At 410, the network entity 105-*e* may configure one or more reference signal measurements for the UE 115-*c* associated with measuring the second cell with the inclusion of a time gap, in accordance with the capability message.

At 415, the network entity 105-*e* may transmit, via a first cell, a measurement message (e.g., via RRC signaling) that indicates a configuration for the one or more reference signal measurements. For example, the configuration may include a resource allocation, including timing parameters (e.g., time resources, a periodicity, a time offset, among others) for communicating one or more inter-cell reference signals to the UE 115-*c* associated with measuring the second cell that includes a configured time gap (e.g., for receiving the one or more inter-cell reference signals from the network entity 105-*f* via the second cell).

At 420, the UE 115-*c* may request a time gap to be included between communications via the first cell and communication of the one or more inter-cell reference signals that is in addition to the configured time gap. The request for the additional time gap may be based on the one or more timing parameters included in the configuration for communicating the one or more inter-cell reference signals. For example, the UE 115-*c* may use the timing parameters included in the configuration to determine that the configured time gap is insufficient (e.g., too short, insufficient in duration) to enable the UE to measure the one or more inter-cell reference signals. The UE 115-*c* may determine a time gap that may be included in addition to the configured time gap such that the UE 115-*c* may properly measure the one or more inter-cell reference signals via the second cell. The request for the additional time gap may include a duration of the time gap, a periodicity of the time gap, or a time offset relative to a starting slot of a time interval via which the one or more inter-cell reference signals are received. In some examples, the request for the additional time gap may be transmitted to the network entity 105-*e* via positioning signaling (e.g., LocationMeasurementIndication, InterFreqRSTDMeasurementIndication) associated with requesting time gaps between communication of PRSs.

The request for the additional time gap may be based on the second cell operating in a different frequency or RAT than the first cell. For example, the first cell may be associated with a first frequency band and the second cell may be associated with a second frequency band. During the time gap, the UE 115-*c* may tune an RF chain of the UE 115-*c* from the first cell to the second cell. For example, the UE 115-*b* may tune the RF chain from a first frequency associated with the first cell (e.g., within the first frequency band) to a second frequency associated with the second cell (e.g., within the second frequency band). Additionally or alternatively, the first cell may be associated with a first RAT and the second cell may be associated with a second RAT. During the time gap, the UE 115-*c* may tune one or more RF components of the UE 115-*c* (e.g., the RF chain) from communicating according to the first RAT to communicating according to the second RAT. In some examples, the first cell and the second cell may be intra-frequency cells, but the inter-cell reference signals may be communicated via different portions of a same frequency band such that tuning the RF chain is performed to properly receive the inter-cell reference signals.

Alternatively, at 420, the UE 115-*c* may request for a different time gap than the configured time gap to be included between communications via the first cell and communication of the one or more reference signals. Here, the requested time gap may be used instead of the configured time gap. In some examples, the UE 115-*c* may determine that the configured time gap is excessive in duration. That is, the UE 115-*c* may determine that a duration of the configured time gap may be greater than a duration for the UE 115-*c* to tune an RF chain from the first cell to the second cell. Based on the determination, the UE 115-*c* may request for a time gap with a duration that is less than the duration of the configured time gap, but still sufficient to enable the UE 115-*c* to properly measure the inter-cell reference signals.

At 425, the network entity 105-f may transmit the one or more reference signals to the UE 115-c. The network entity 105-f may transmit the one or more reference signals in accordance with the configured time gap and the additional time gap requested by the UE 115-c. Additionally, or alternatively, the network entity 105-f may transmit the one or more inter-cell reference signals in accordance with the requested time gap instead of the configured time gap.

At 430, the UE 115-c may perform measurements of the reference signals to determine one or more communication characteristics associated with the second cell, which may enable the UE 115-b to determine whether to perform a handover procedure to the second cell. The UE 115-c may perform measurements of the reference signals in association with tuning an RF chain of the UE 115-c from the first cell to the second cell.

At 435, upon completing measurements of the reference signals, the UE 115-c may request for the network entity 105-c to disable the time gap(s). For example, the UE 115-b may transmit a disable message that requests to disable the inclusion of the time gap in accordance with the periodicity indicated in the request for the time gap. The UE 115-c may signal to the network entity 105-e to disable time gaps via positioning signaling (e.g., LocationMeasurementIndication, InterFreqRSTDMeasurementIndication).

Figure 5:
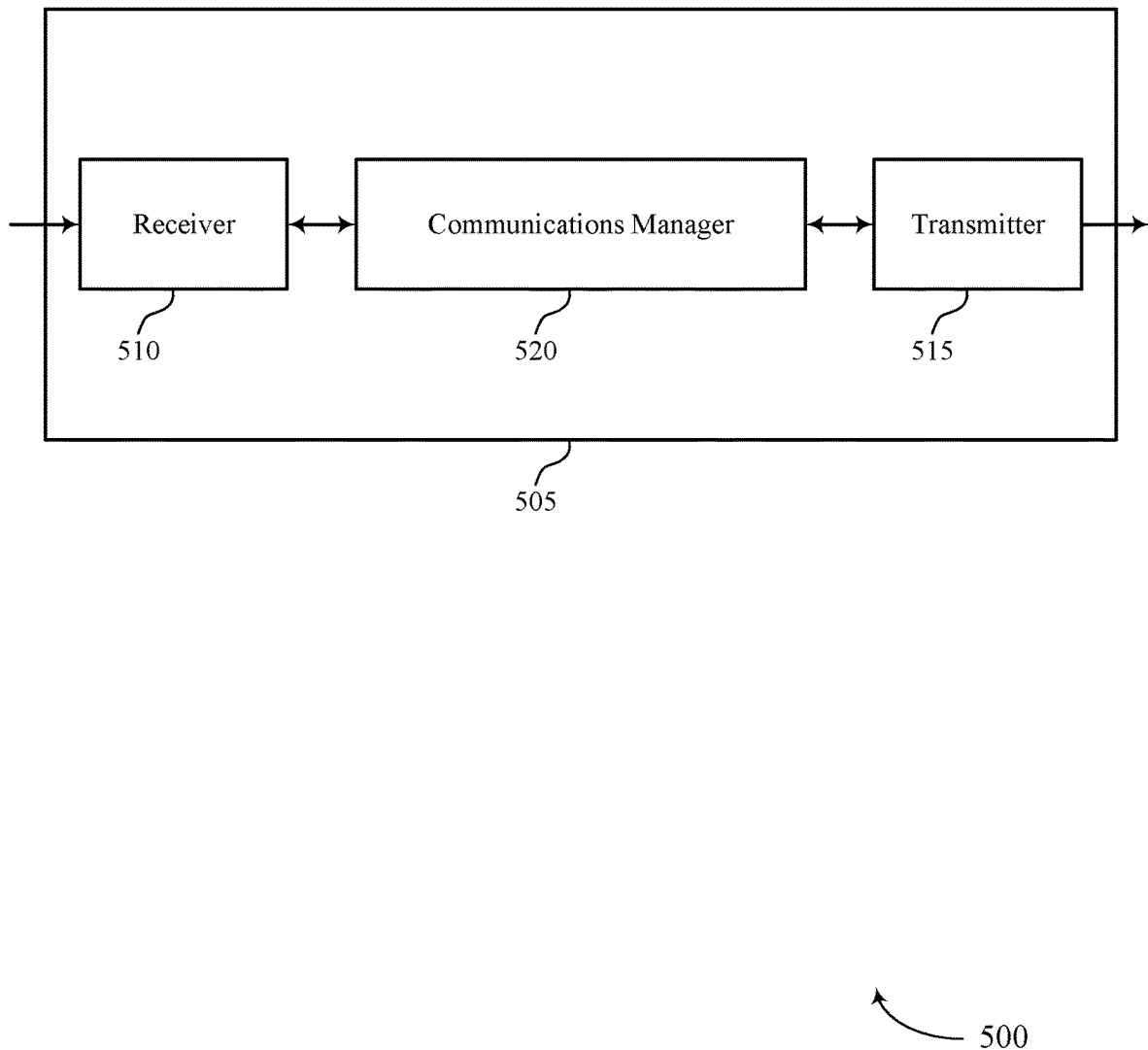
FIGS. 5 and 6 illustrate block diagrams of devices that support techniques for requesting reference signal measurement gaps in accordance with one or more aspects of the present disclosure.

FIG. 5 illustrates a block diagram 500 of a device 505 that supports techniques for requesting reference signal measurement gaps in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for requesting reference signal measurement gaps). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for requesting reference signal measurement gaps). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for requesting reference signal measurement gaps as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity via a first cell, signaling that indicates a configuration for communicating a reference signal associated with measuring a second cell. The communications manager 520 may be configured as or otherwise support a means for transmitting, to the network entity and based on the configuration, a request for a time gap to be included between communications via the first cell and communication of the reference signal. The communications manager 520 may be configured as or otherwise support a means for receiving, via the second cell and in response to the request for the time gap, the reference signal in accordance with the time gap.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing power consumption at a UE, for example, by supporting correct measurements of reference signals without retransmission. The device 505 may also support techniques for efficient utilization of communication resources by reducing the frequency of call drops or radio link failures, reducing the use of excessive time gaps, or a combination thereof.

Figure 6:
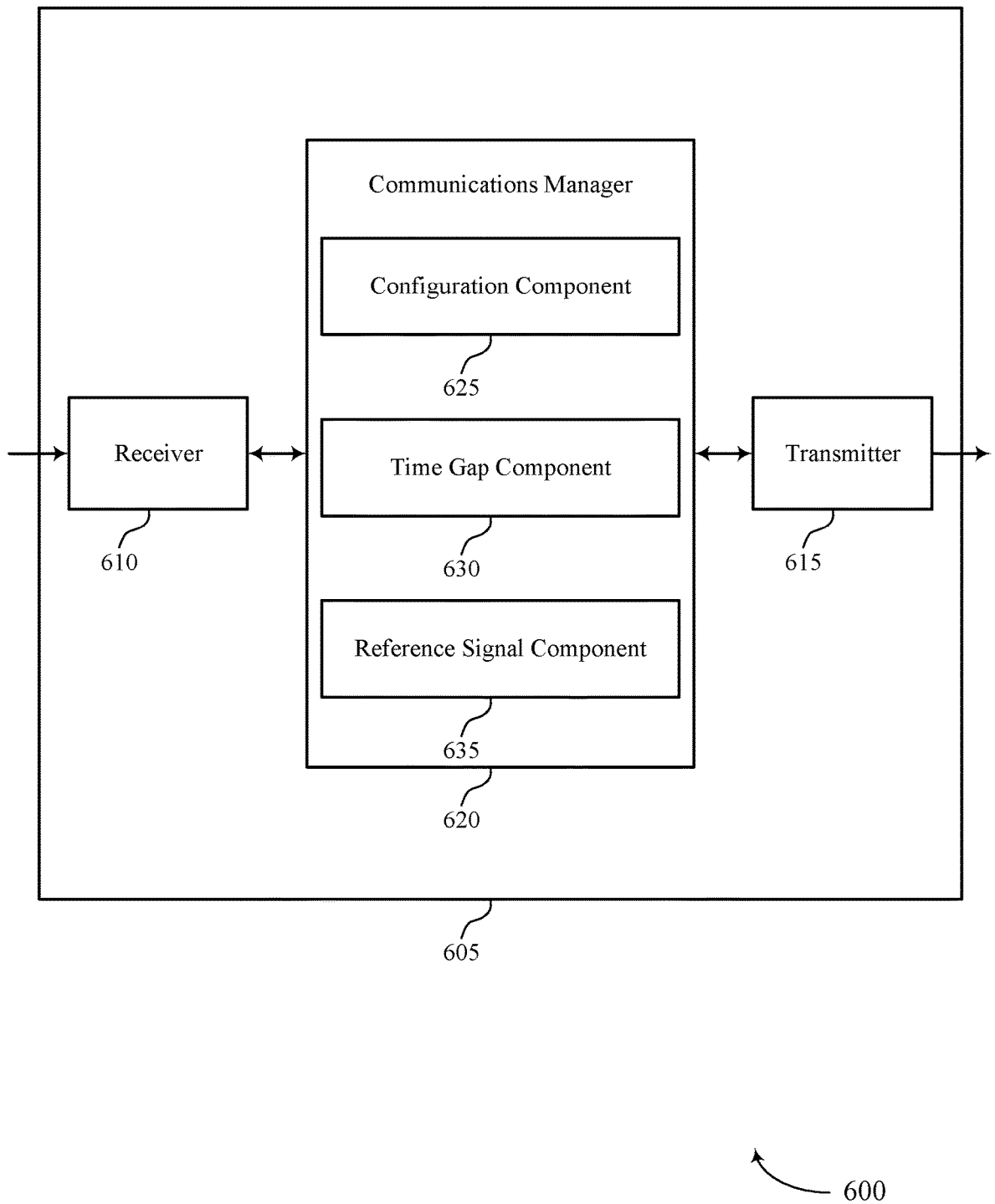

FIG. 6 illustrates a block diagram 600 of a device 605 that supports techniques for requesting reference signal measurement gaps in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for requesting reference signal measurement gaps). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for requesting reference signal measurement gaps). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for requesting reference signal measurement gaps as described herein. For example, the communications manager 620 may include a configuration component 625, a time gap component 630, a reference signal component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The configuration component 625 may be configured as or otherwise support a means for receiving, from a network entity via a first cell, signaling that indicates a configuration for communicating a reference signal associated with measuring a second cell. The time gap component 630 may be configured as or otherwise support a means for transmitting, to the network entity and based on the configuration, a request for a time gap to be included between communications via the first cell and communication of the reference signal. The reference signal component 635 may be configured as or otherwise support a means for receiving, via the second cell and in response to the request for the time gap, the reference signal in accordance with the time gap.

Figure 7:
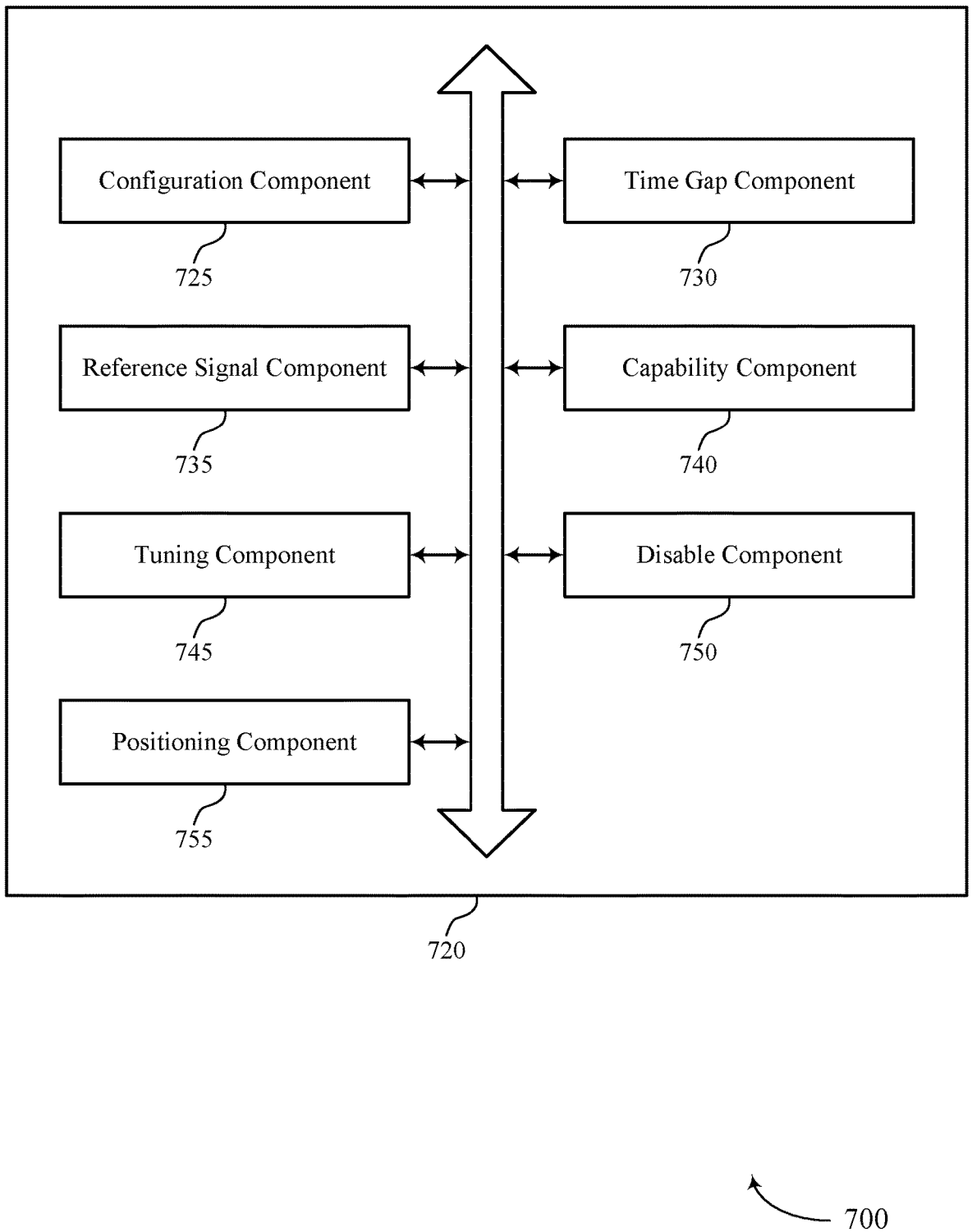
FIG. 7 illustrates a block diagram of a communications manager that supports techniques for requesting reference signal measurement gaps in accordance with one or more aspects of the present disclosure.

FIG. 7 illustrates a block diagram 700 of a communications manager 720 that supports techniques for requesting reference signal measurement gaps in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for requesting reference signal measurement gaps as described herein. For example, the communications manager 720 may include a configuration component 725, a time gap component 730, a reference signal component 735, a capability component 740, a tuning component 745, a disable component 750, a positioning component 755, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving, from a network entity via a first cell, signaling that indicates a configuration for communicating a reference signal associated with measuring a second cell. The time gap component 730 may be configured as or otherwise support a means for transmitting, to the network entity and based on the configuration, a request for a time gap to be included between communications via the first cell and communication of the reference signal. The reference signal component 735 may be configured as or otherwise support a means for receiving, via the second cell and in response to the request for the time gap, the reference signal in accordance with the time gap.

In some examples, to support transmitting the request for the time gap, the time gap component 730 may be configured as or otherwise support a means for transmitting the request for the time gap via positioning signaling associated with requesting time gaps between communication of PRSs via inter-frequency cells, intra-frequency cells, inter-RAT cells, or a combination thereof.

In some examples, the capability component 740 may be configured as or otherwise support a means for transmitting, to the network entity via the first cell, a capability message indicating for the exclusion of a respective time gap before communication of respective reference signals associated with measuring the second cell, where the configuration for communicating the reference signal excludes a configuration for the time gap based on the capability message.

In some examples, the time gap component 730 may be configured as or otherwise support a means for determining to request the inclusion of the time gap based on one or more timing parameters included in the configuration for communicating the reference signal, where the request for the time gap is transmitted based on the determination and the exclusion of the configuration for the time gap.

In some examples, the capability component 740 may be configured as or otherwise support a means for transmitting, to the network entity via the first cell, a capability message indicating for the inclusion of a respective time gap before communication of respective reference signals associated with measuring the second cell, where the configuration for communicating the reference signal includes a configuration for a second time gap between the communications via the first cell and the communication of the reference signal based on the capability message. In some examples, the time gap component 730 may be configured as or otherwise support a means for determining that the second time gap is insufficient to enable the UE to measure the reference signal, where the request for the time gap is transmitted based on the determination.

In some examples, the time gap is included between the communications via the first cell and the communication of the reference signal in addition to the second time gap. In some examples, the time gap is included between the communications via the first cell and the communication of the reference signal instead of the second time gap.

In some examples, the tuning component 745 may be configured as or otherwise support a means for tuning, during the time gap, an RF chain of the UE from a first frequency associated with the first cell to a second frequency associated with the second cell the second cell, from a first RAT associated with the first cell to a second RAT associated with the second cell, or both, where the reference signal is received via the second cell based on the tuning.

In some examples, the request for the time gap includes a duration of the time gap, a periodicity of the time gap, a time offset relative to a starting slot of a transmission time interval via which the reference signal is received, or a combination thereof.

In some examples, the reference signal component 735 may be configured as or otherwise support a means for receiving, via the second cell and based on the periodicity of the time gap, a second reference signal associated with measuring the second cell in accordance with the time gap.

In some examples, the request for the time gap indicates a periodicity of the time gap for inclusion between subsequent communications via the first cell and communication of subsequent reference signals associated with measuring the second cell, and the disable component 750 may be configured as or otherwise support a means for transmitting, to the network entity via the first cell, a second request to disable the inclusion of the time gap in accordance with the indicated periodicity.

In some examples, the positioning component 755 may be configured as or otherwise support a means for determining that the network entity supports a positioning procedure associated with the UE, where the request for the time gap is transmitted to the network entity based on the determination.

In some examples, the configuration for communicating the reference signal includes a configuration of a second time gap. In some examples, the request for the time gap is transmitted based on a duration of the second time gap being greater than a duration for the UE to tune an RF chain from the first cell to the second cell, a duration of the time gap being less than the duration of the second time gap.

In some examples, the first cell is associated with a first frequency and the second cell is associated with a second frequency. In some examples, the request for the time gap is transmitted based on the first frequency and the second frequency being different.

In some examples, the first cell is associated with a first RAT and the second cell is associated with a second RAT. In some examples, the request for the time gap is transmitted based on the first RAT and the second RAT being different.

Figure 8:
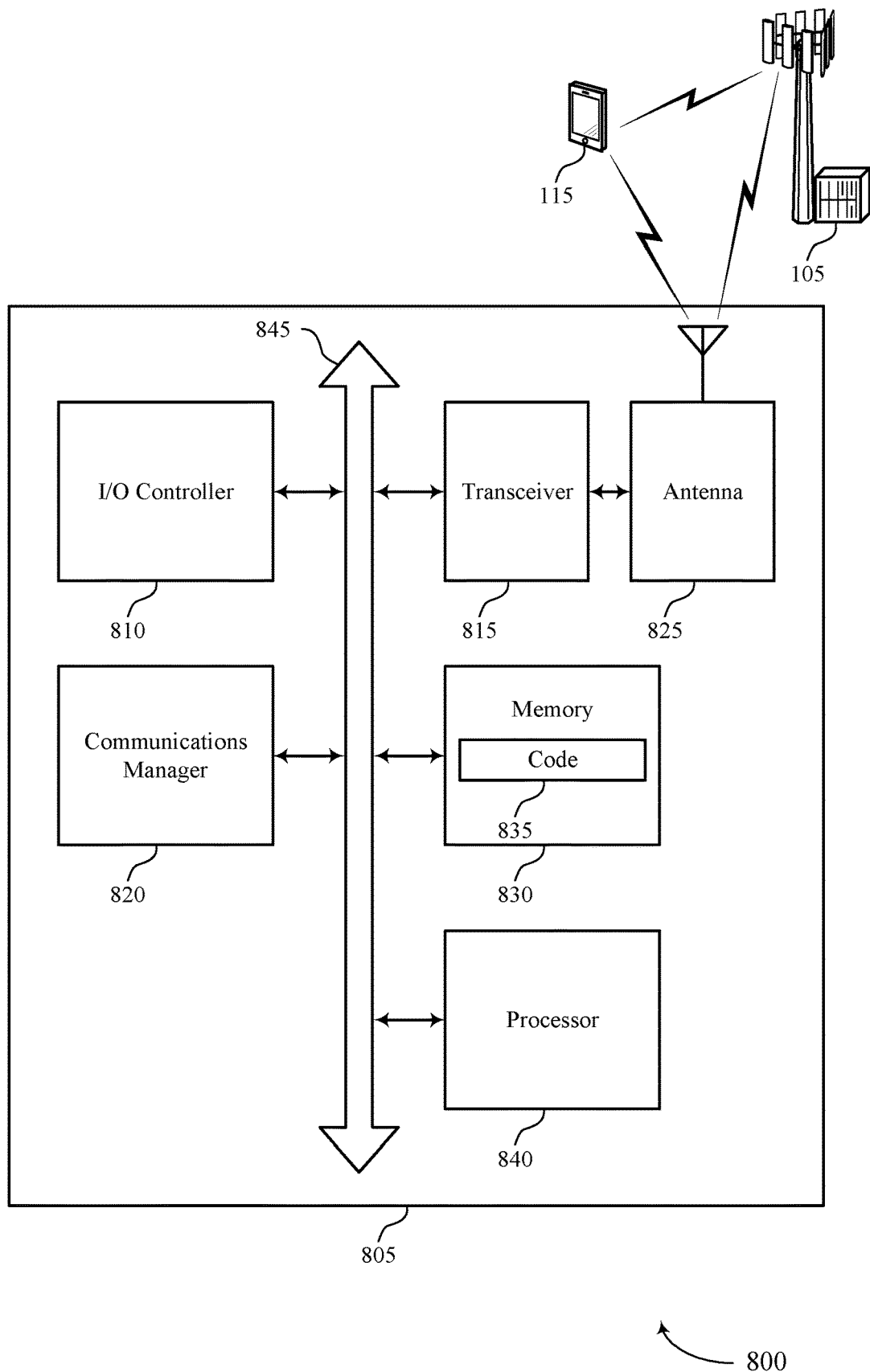
FIG. 8 illustrates a diagram of a system including a device that supports techniques for requesting reference signal measurement gaps in accordance with one or more aspects of the present disclosure.

FIG. 8 illustrates a diagram of a system 800 including a device 805 that supports techniques for requesting reference signal measurement gaps in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for requesting reference signal measurement gaps). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity via a first cell, signaling that indicates a configuration for communicating a reference signal associated with measuring a second cell. The communications manager 820 may be configured as or otherwise support a means for transmitting, to the network entity and based on the configuration, a request for a time gap to be included between communications via the first cell and communication of the reference signal. The communications manager 820 may be configured as or otherwise support a means for receiving, via the second cell and in response to the request for the time gap, the reference signal in accordance with the time gap.

By including or configuring the communications manager 820 in accordance with examples as described herein, the device 805 may support techniques for a longer battery life of a UE by reducing power consumption due to idle time, increased communication reliability, proper measurement of inter-cell reference signals, reduced frequency of call drops or radio link failure due to the proper measurement of inter-cell reference signals, and improved user experience associated with reduced frequency of call drops or radio link failure, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for requesting reference signal measurement gaps as described herein, or the processor 840 and the memory 830 may be otherwise configured to perform or support such operations.

Figure 9:
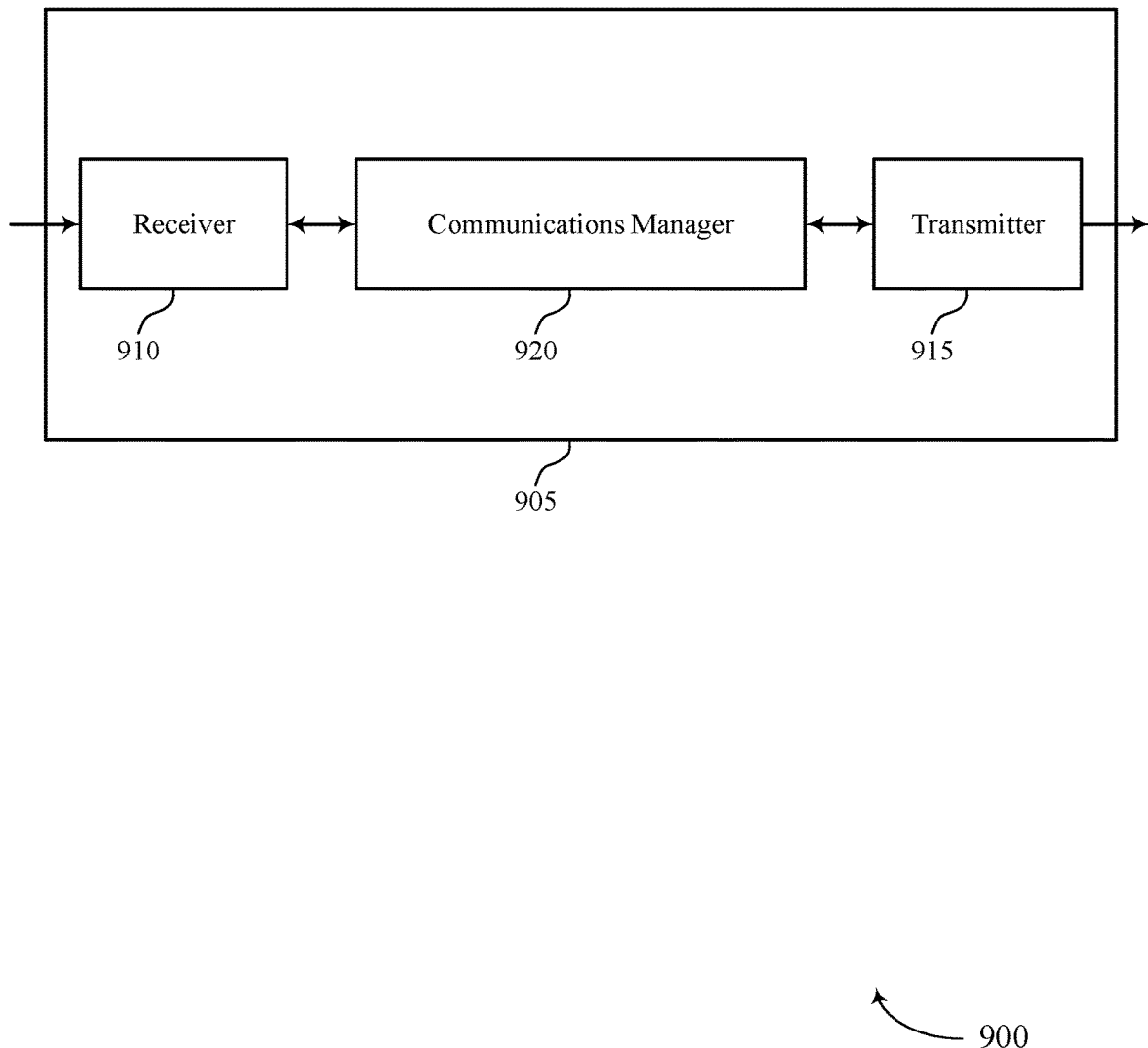
FIGS. 9 and 10 illustrate block diagrams of devices that support techniques for requesting reference signal measurement gaps in accordance with one or more aspects of the present disclosure.

FIG. 9 illustrates a block diagram 900 of a device 905 that supports techniques for requesting reference signal measurement gaps in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for requesting reference signal measurement gaps as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for outputting, via a first cell, signaling that indicates a configuration for communicating a reference signal associated with measurement of a second cell by a UE. The communications manager 920 may be configured as or otherwise support a means for obtaining, basing at least in part on the configuration, a request for a time gap to be included between communications via the first cell and communication of the reference signal, where the reference signal is communicated via the second cell in accordance with the time gap in response to the request for the time gap.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing power consumption, for example, by supporting correct measurements of reference signals without retransmission The device 905 may also support techniques for efficient utilization of communication resources by reducing the frequency of call drops or radio link failures, reducing the use of excessive time gaps, or a combination thereof.

Figure 10:
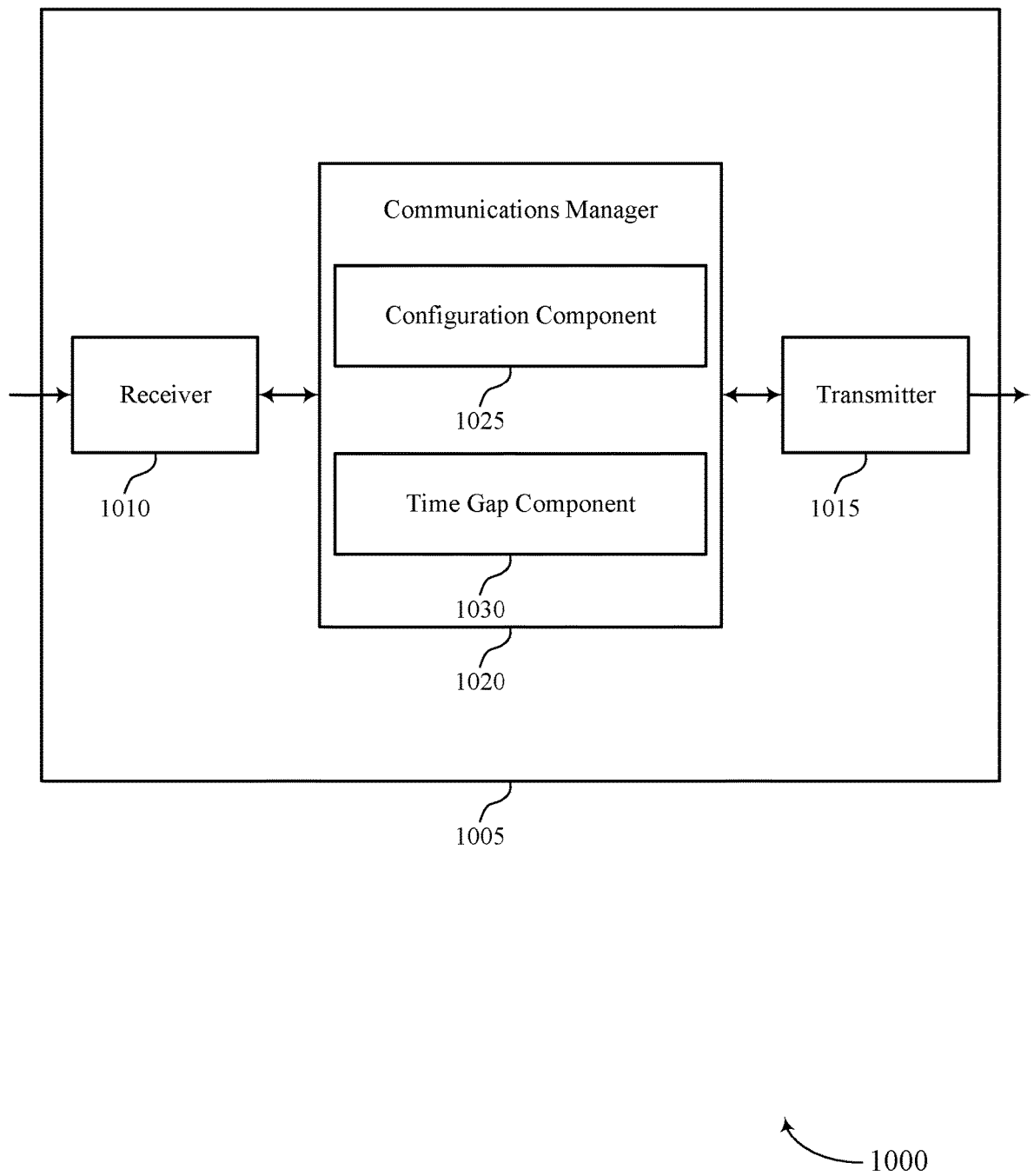

FIG. 10 illustrates a block diagram 1000 of a device 1005 that supports techniques for requesting reference signal measurement gaps in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for requesting reference signal measurement gaps as described herein. For example, the communications manager 1020 may include a configuration component 1025 a time gap component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration component 1025 may be configured as or otherwise support a means for outputting, via a first cell, signaling that indicates a configuration for communicating a reference signal associated with measurement of a second cell by a UE. The time gap component 1030 may be configured as or otherwise support a means for obtaining, based on the configuration, a request for a time gap to be included between communications via the first cell and communication of the reference signal, where the reference signal is communicated via the second cell in accordance with the time gap in response to the request for the time gap.

Figure 11:
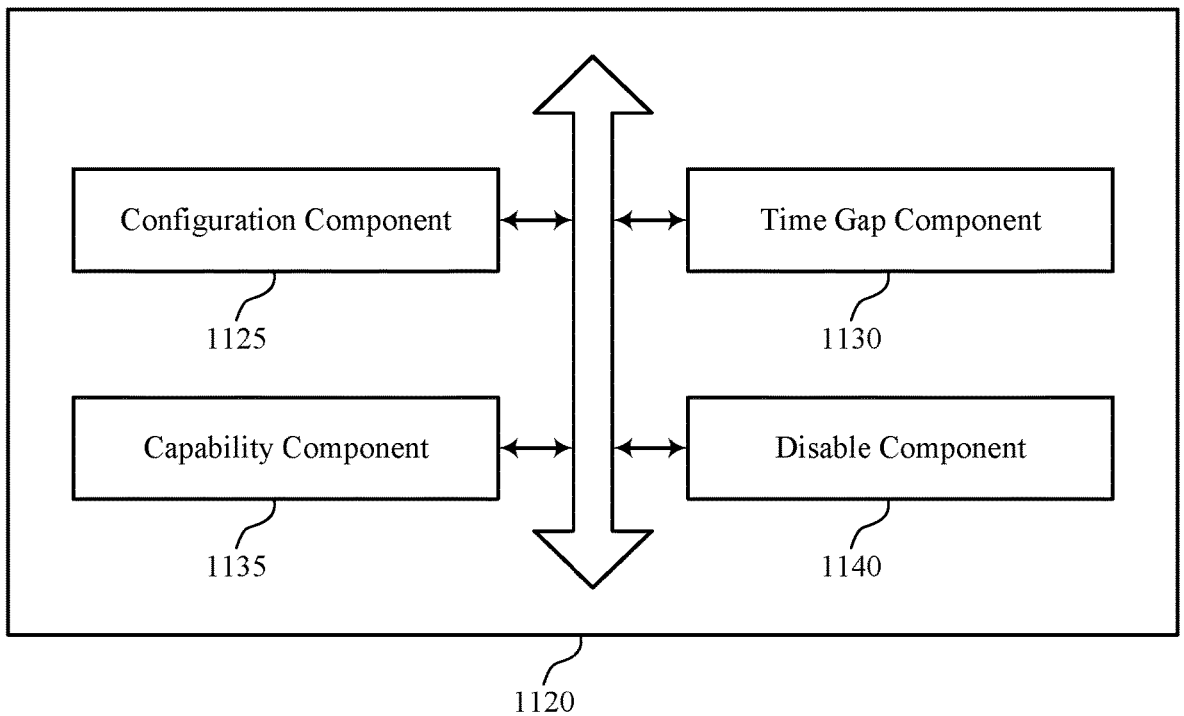
FIG. 11 illustrates a block diagram of a communications manager that supports techniques for requesting reference signal measurement gaps in accordance with one or more aspects of the present disclosure.

FIG. 11 illustrates a block diagram 1100 of a communications manager 1120 that supports techniques for requesting reference signal measurement gaps in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for requesting reference signal measurement gaps as described herein. For example, the communications manager 1120 may include a configuration component 1125, a time gap component 1130, a capability component 1135, a disable component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for outputting, via a first cell, signaling that indicates a configuration for communicating a reference signal associated with measurement of a second cell by a UE. The time gap component 1130 may be configured as or otherwise support a means for obtaining, based on the configuration, a request for a time gap to be included between communications via the first cell and communication of the reference signal, where the reference signal is communicated via the second cell in accordance with the time gap in response to the request for the time gap.

In some examples, to support obtaining the request for the time gap, the time gap component 1130 may be configured as or otherwise support a means for obtaining the request for the time gap via positioning signaling associated with requesting time gaps between communication of positioning reference signals via inter-frequency cells, intra-frequency cells, inter-RAT cells, or a combination thereof.

In some examples, the capability component 1135 may be configured as or otherwise support a means for obtaining, via the first cell, a capability message associated with the UE that indicates for the exclusion of a respective time gap before communication of respective reference signals associated with measuring the second cell, where the configuration for communicating the reference signal excludes a configuration for the time gap based on the capability message.

In some examples, the request for the time gap is obtained based on one or more timing parameters included in the configuration for communicating the reference signal and the exclusion of the configuration for the time gap.

In some examples, the capability component 1135 may be configured as or otherwise support a means for obtaining, via the first cell, a capability message associated with the UE that indicates for the inclusion of a respective time gap before communication of respective reference signals associated with measuring the second cell, where the configuration for communicating the reference signal includes a configuration for a second time gap between the communications via the first cell and the communication of the reference signal based on the capability message, and where the request for the time gap is obtained based on the second time gap being insufficient to enable the UE to measure the reference signal.

In some examples, the time gap is included between the communications via the first cell and the communication of the reference signal in addition to the second time gap. In some examples, the time gap is included between the communications via the first cell and the communication of the reference signal instead of the second time gap.

In some examples, the request for the time gap includes a duration of the time gap, a periodicity of the time gap, a time offset relative to a starting slot of a transmission time interval via which the reference signal is output, or a combination thereof.

In some examples, the request for the time gap indicates a periodicity of the time gap for inclusion between subsequent communications via the first cell and communication of subsequent reference signals associated with measuring the second cell, and the disable component 1140 may be configured as or otherwise support a means for obtaining, via the first cell, a second request to disable the inclusion of the time gap in accordance with the indicated periodicity.

In some examples, the request for the time gap is obtained based on the network entity supporting a positioning procedure associated with the UE.

In some examples, the configuration for communicating the reference signal includes a configuration of a second time gap. In some examples, the request for the time gap is obtained based on a duration of the second time gap being greater than a duration for the UE to tune an RF chain from the first cell to the second cell, a duration of the time gap being less than the duration of the second time gap.

In some examples, the first cell is associated with a first frequency and the second cell is associated with a second frequency. In some examples, the request for the time gap is obtained based on the first frequency and the second frequency being different.

In some examples, the first cell is associated with a first RAT and the second cell is associated with a second RAT. In some examples, the request for the time gap is obtained based on the first RAT and the second RAT being different.

Figure 12:
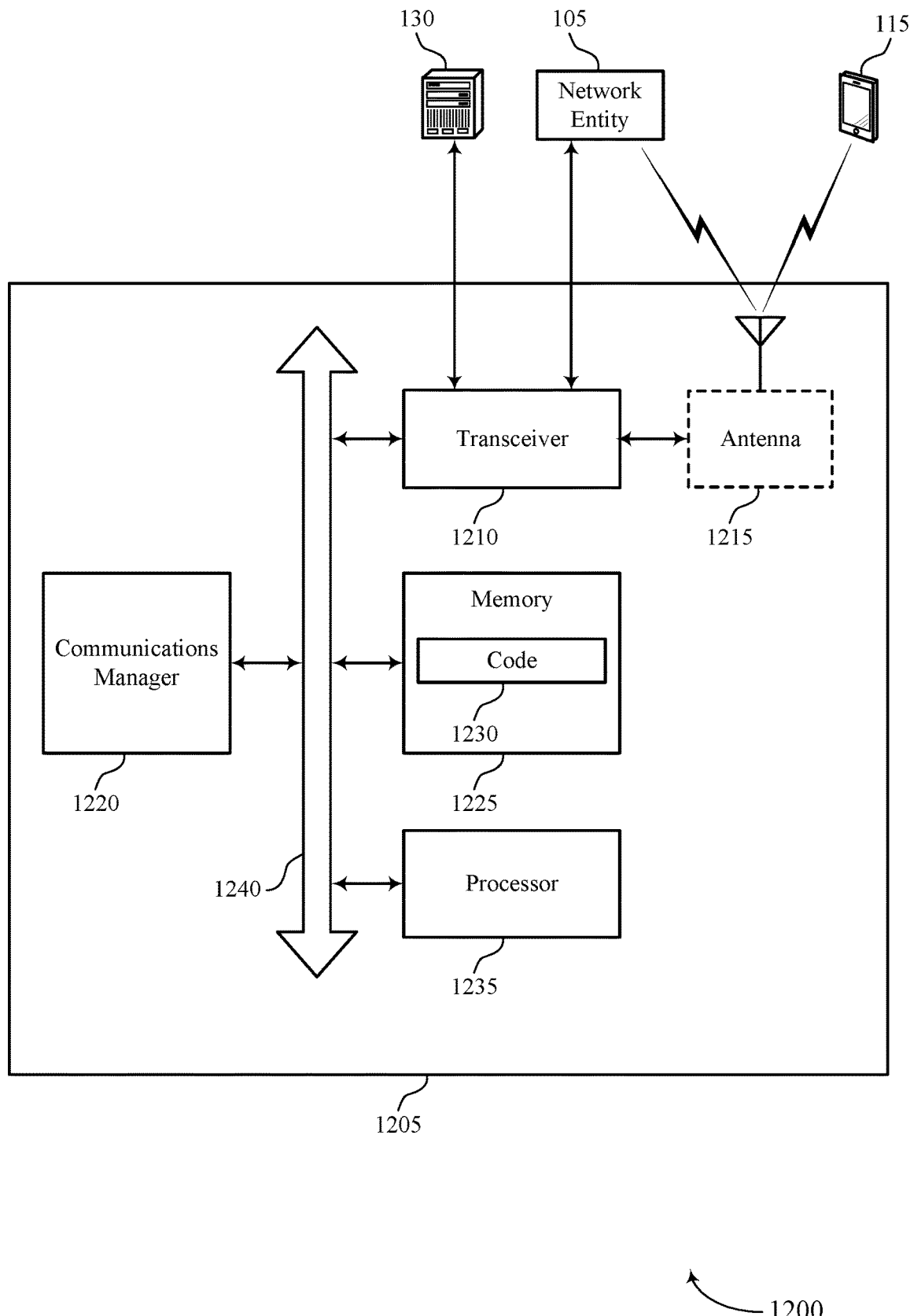
FIG. 12 illustrates a diagram of a system including a device that supports techniques for requesting reference signal measurement gaps in accordance with one or more aspects of the present disclosure.

FIG. 12 illustrates a diagram of a system 1200 including a device 1205 that supports techniques for requesting reference signal measurement gaps in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for requesting reference signal measurement gaps). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for outputting, via a first cell, signaling that indicates a configuration for communicating a reference signal associated with measurement of a second cell by a UE. The communications manager 1220 may be configured as or otherwise support a means for obtaining, basing at least in part on the configuration, a request for a time gap to be included between communications via the first cell and communication of the reference signal, where the reference signal is communicated via the second cell in accordance with the time gap in response to the request for the time gap.

By including or configuring the communications manager 1220 in accordance with examples as described herein, the device 1205 may support techniques for reduced power consumption due to reduced idle time, increased communication reliability, proper measurement of inter-cell reference signals, reduced frequency of call drops or radio link failure due to the proper measurement of inter-cell reference signals, and improved user experience associated with reduced frequency of call drops or radio link failure, among other benefits.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for requesting reference signal measurement gaps as described herein, or the processor 1235 and the memory 1225 may be otherwise configured to perform or support such operations.

Figure 13:
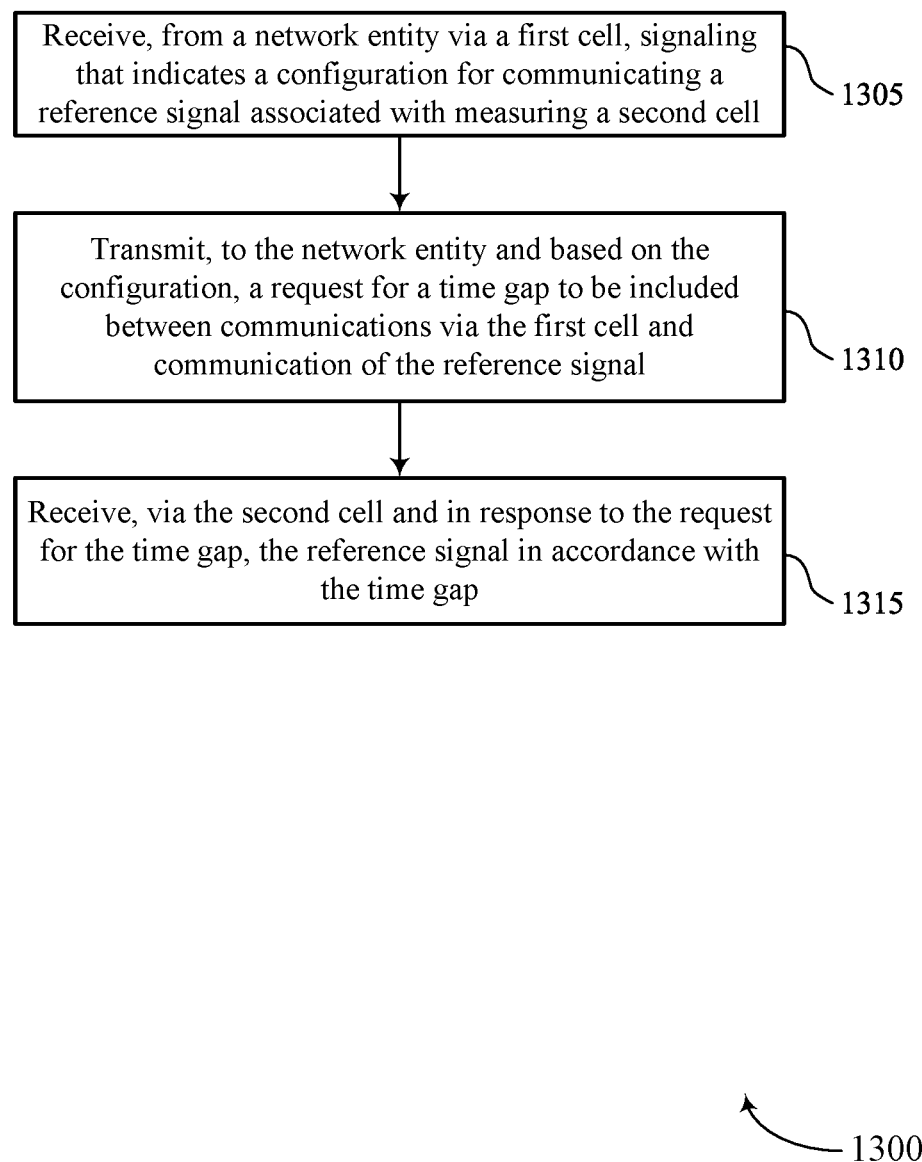
FIGS. 13 through 20 illustrate flowcharts showing methods that support techniques for requesting reference signal measurement gaps in accordance with one or more aspects of the present disclosure.

FIG. 13 illustrates a flowchart illustrating a method 1300 that supports techniques for requesting reference signal measurement gaps in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity via a first cell, signaling that indicates a configuration for communicating a reference signal associated with measuring a second cell. The operations of 1305 may be performed in accordance with examples as disclosed herein. In some examples, aspects of the operations of 1305 may be performed by a configuration component 725 as described with reference to FIG. 7.

At 1310, the method may include transmitting, to the network entity and based on the configuration, a request for a time gap to be included between communications via the first cell and communication of the reference signal. The operations of 1310 may be performed in accordance with examples as disclosed herein. In some examples, aspects of the operations of 1310 may be performed by a time gap component 730 as described with reference to FIG. 7.

At 1315, the method may include receiving, via the second cell and in response to the request for the time gap, the reference signal in accordance with the time gap. The operations of 1315 may be performed in accordance with examples as disclosed herein. In some examples, aspects of the operations of 1315 may be performed by a reference signal component 735 as described with reference to FIG. 7.

Figure 14:
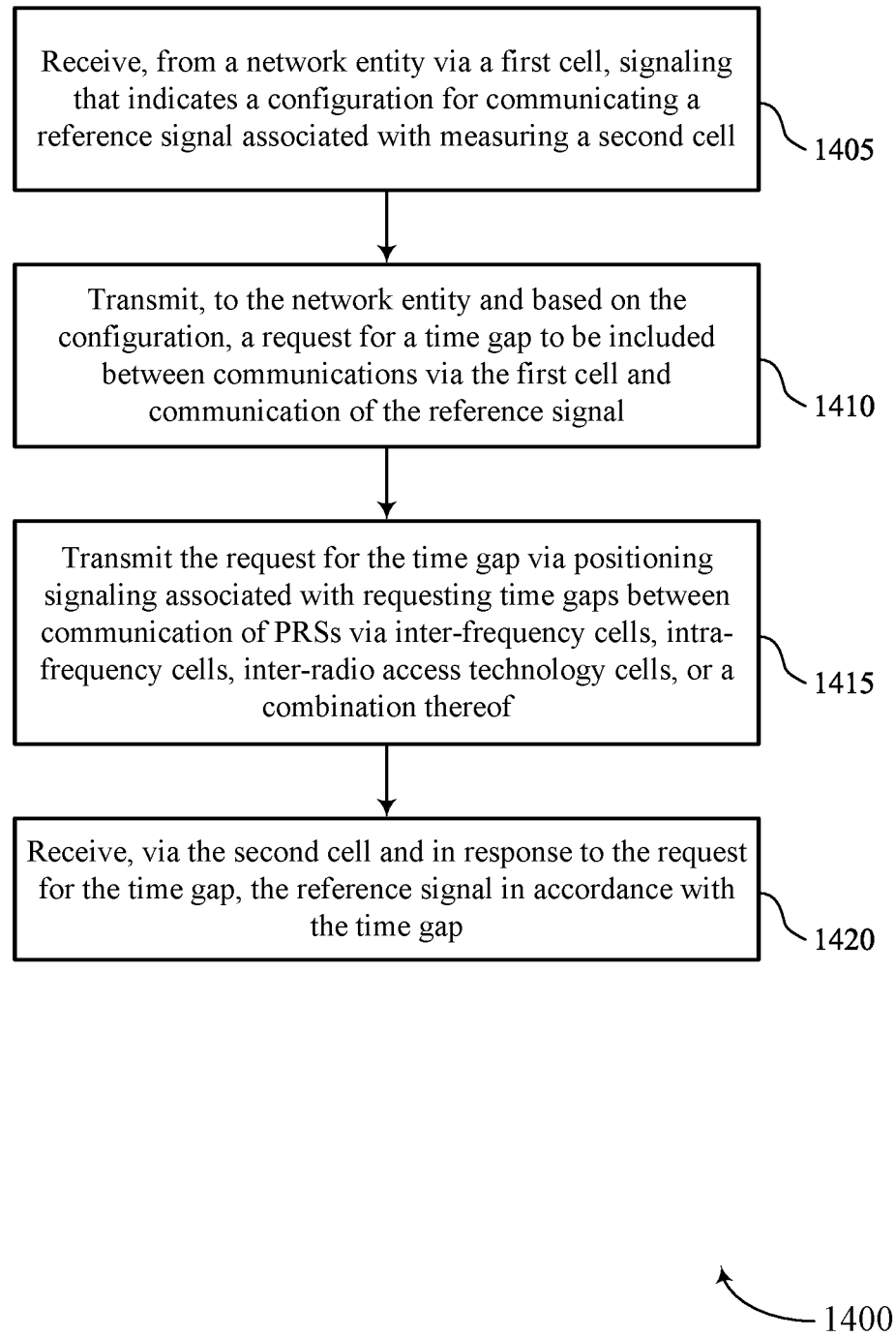

FIG. 14 illustrates a flowchart illustrating a method 1400 that supports techniques for requesting reference signal measurement gaps in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity via a first cell, signaling that indicates a configuration for communicating a reference signal associated with measuring a second cell. The operations of 1405 may be performed in accordance with examples as disclosed herein. In some examples, aspects of the operations of 1405 may be performed by a configuration component 725 as described with reference to FIG. 7.

At 1410, the method may include transmitting, to the network entity and based on the configuration, a request for a time gap to be included between communications via the first cell and communication of the reference signal. The operations of 1410 may be performed in accordance with examples as disclosed herein. In some examples, aspects of the operations of 1410 may be performed by a time gap component 730 as described with reference to FIG. 7.

At 1415, to support transmitting the request for the time gap, the method may include transmitting the request for the time gap via positioning signaling associated with requesting time gaps between communication of PRSs via inter-frequency cells, intra-frequency cells, inter-RAT cells, or a combination thereof. The operations of 1415 may be performed in accordance with examples as disclosed herein. In some examples, aspects of the operations of 1415 may be performed by a time gap component 730 as described with reference to FIG. 7.

At 1420, the method may include receiving, via the second cell and in response to the request for the time gap, the reference signal in accordance with the time gap. The operations of 1420 may be performed in accordance with examples as disclosed herein. In some examples, aspects of the operations of 1420 may be performed by a reference signal component 735 as described with reference to FIG. 7.

Figure 15:
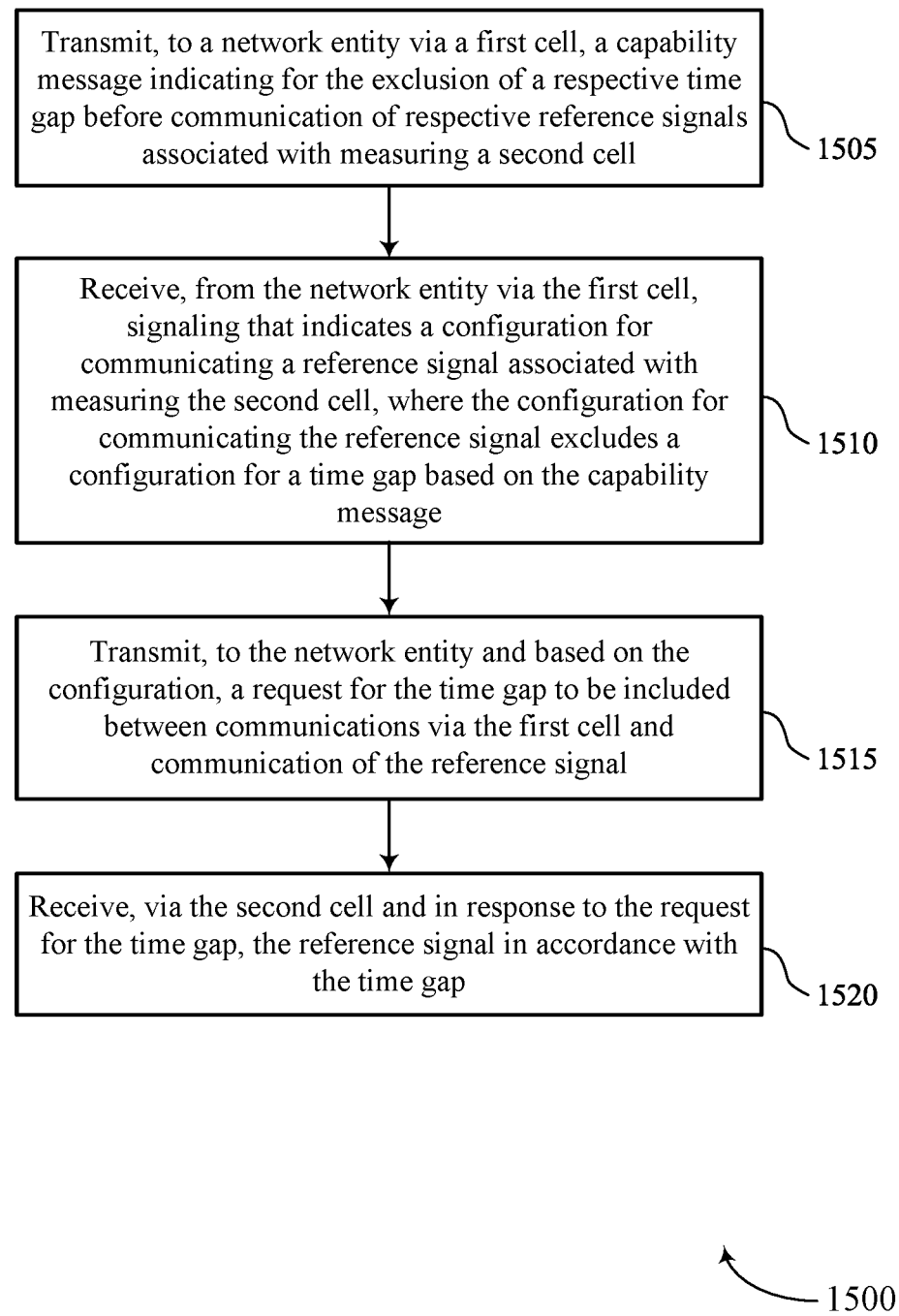

FIG. 15 illustrates a flowchart illustrating a method 1500 that supports techniques for requesting reference signal measurement gaps in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity via a first cell, a capability message indicating for the exclusion of a respective time gap before communication of respective reference signals associated with measuring a second cell. The operations of 1505 may be performed in accordance with examples as disclosed herein. In some examples, aspects of the operations of 1505 may be performed by a capability component 740 as described with reference to FIG. 7.

At 1510, the method may include receiving, from the network entity via the first cell, signaling that indicates a configuration for communicating a reference signal associated with measuring the second cell, where the configuration for communicating the reference signal excludes a configuration for a time gap based on the capability message. The operations of 1510 may be performed in accordance with examples as disclosed herein. In some examples, aspects of the operations of 1510 may be performed by a configuration component 725 as described with reference to FIG. 7.

At 1515, the method may include transmitting, to the network entity and based on the configuration, a request for a time gap to be included between communications via the first cell and communication of the reference signal. The operations of 1515 may be performed in accordance with examples as disclosed herein. In some examples, aspects of the operations of 1515 may be performed by a time gap component 730 as described with reference to FIG. 7.

At 1520, the method may include receiving, via the second cell and in response to the request for the time gap, the reference signal in accordance with the time gap. The operations of 1520 may be performed in accordance with examples as disclosed herein. In some examples, aspects of the operations of 1520 may be performed by a reference signal component 735 as described with reference to FIG. 7.

Figure 16:
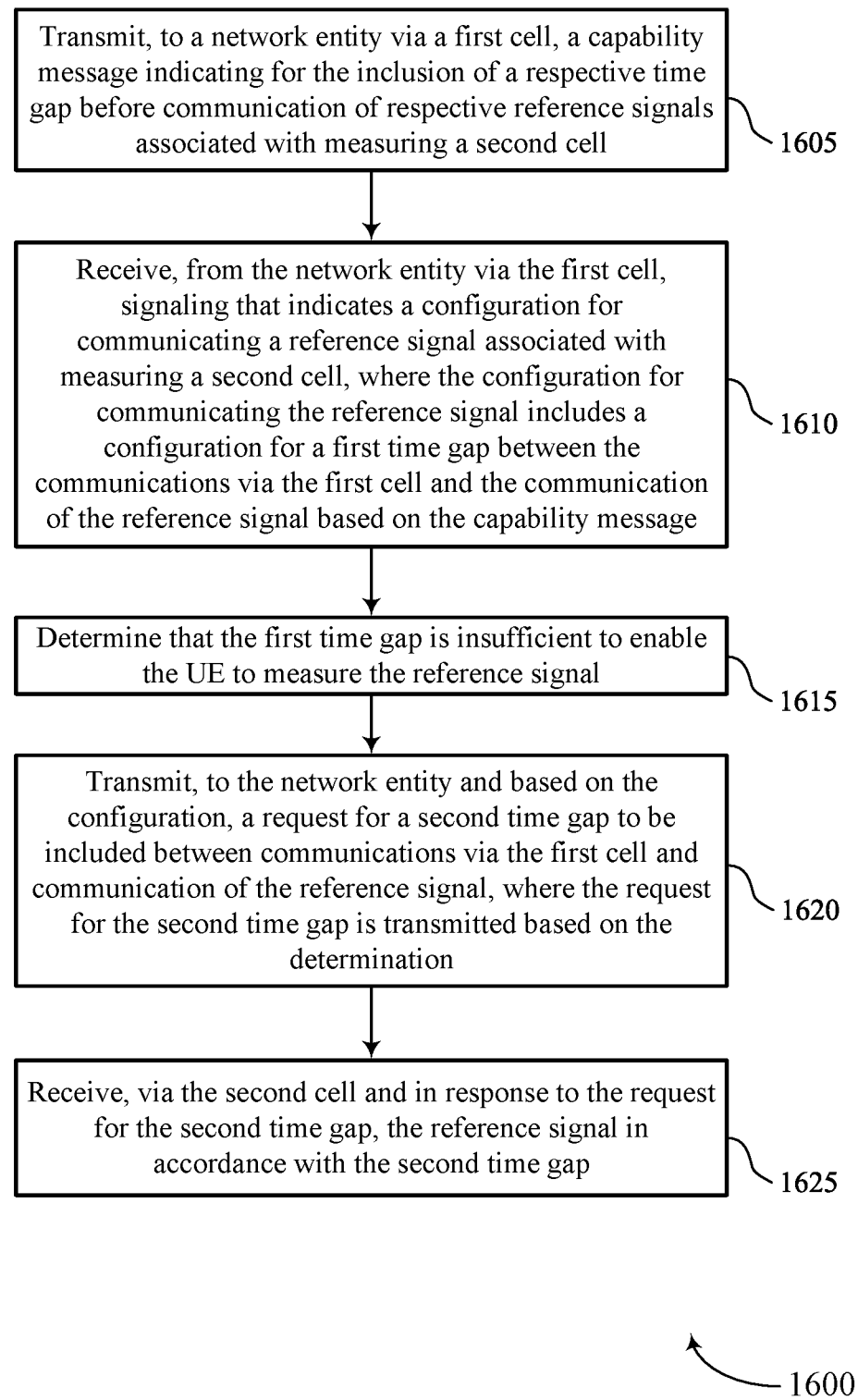

FIG. 16 illustrates a flowchart illustrating a method 1600 that supports techniques for requesting reference signal measurement gaps in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity via a first cell, a capability message indicating for the inclusion of a respective time gap before communication of respective reference signals associated with measuring a second cell. The operations of 1605 may be performed in accordance with examples as disclosed herein. In some examples, aspects of the operations of 1605 may be performed by a capability component 740 as described with reference to FIG. 7.

At 1610, the method may include receiving, from the network entity via the first cell, signaling that indicates a configuration for communicating a reference signal associated with measuring the second cell, where the configuration for communicating the reference signal includes a configuration for a first time gap between the communications via the first cell and the communication of the reference signal based on the capability message. The operations of 1610 may be performed in accordance with examples as disclosed herein. In some examples, aspects of the operations of 1610 may be performed by a configuration component 725 as described with reference to FIG. 7.

At 1615, the method may include determining that the first time gap is insufficient to enable the UE to measure the reference signal. The operations of 1615 may be performed in accordance with examples as disclosed herein. In some examples, aspects of the operations of 1615 may be performed by a time gap component 730 as described with reference to FIG. 7.

At 1620, the method may include transmitting, to the network entity and based on the configuration, a request for a time gap to be included between communications via the first cell and communication of the reference signal, where the request for the time gap is transmitted based on the determination. The operations of 1620 may be performed in accordance with examples as disclosed herein. In some examples, aspects of the operations of 1620 may be performed by a time gap component 730 as described with reference to FIG. 7.

At 1625, the method may include receiving, via the second cell and in response to the request for the time gap, the reference signal in accordance with the time gap. The operations of 1625 may be performed in accordance with examples as disclosed herein. In some examples, aspects of the operations of 1625 may be performed by a reference signal component 735 as described with reference to FIG. 7.

Figure 17:
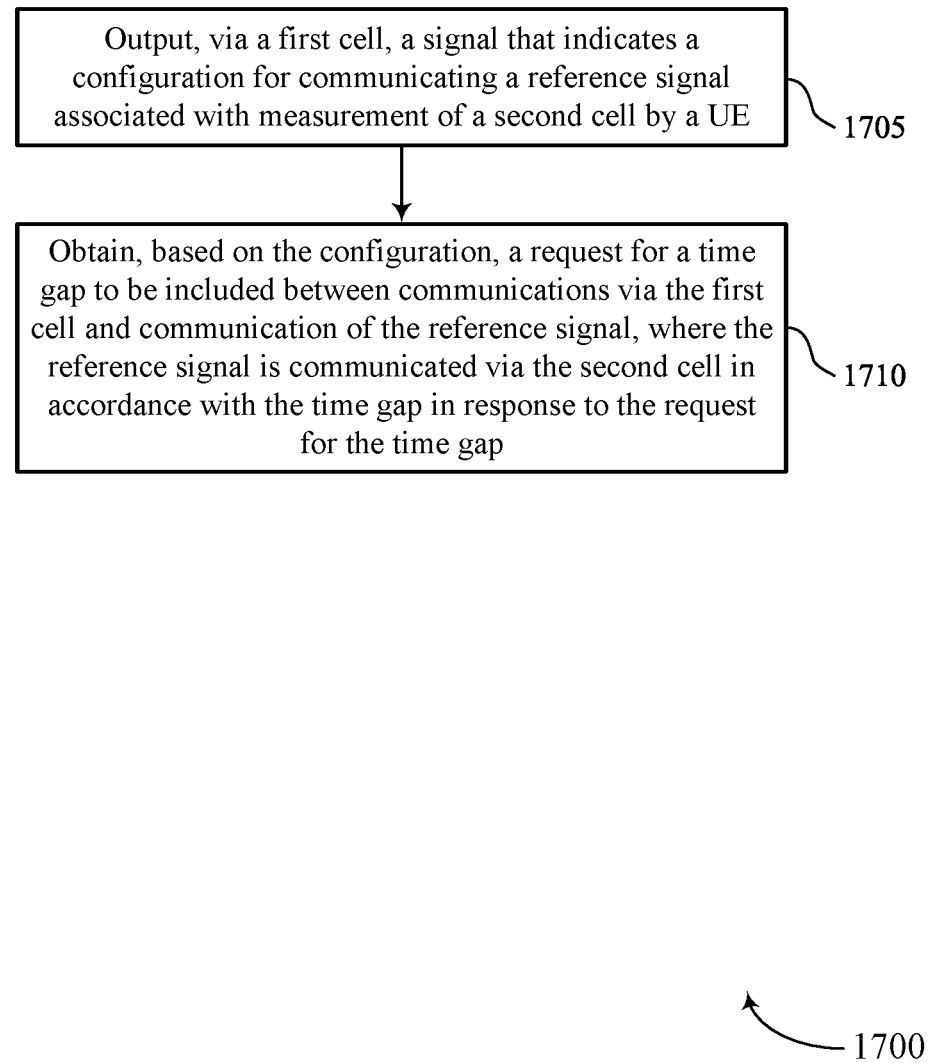

FIG. 17 illustrates a flowchart illustrating a method 1700 that supports techniques for requesting reference signal measurement gaps in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include outputting, via a first cell, a signal that indicates a configuration for communicating the reference signal associated with measurement of a second cell by a UE. The operations of 1705 may be performed in accordance with examples as disclosed herein. In some examples, aspects of the operations of 1705 may be performed by a time gap component 1130 as described with reference to FIG. 11.

At 1710, the method may include obtaining, based on the configuration, a request for a time gap to be included between communications via the first cell and communication of the reference signal, where the reference signal is communicated via the second cell in accordance with the time gap in response to the request for the time gap. The operations of 1710 may be performed in accordance with examples as disclosed herein. In some examples, aspects of the operations of 1710 may be performed by a configuration component 1125 as described with reference to FIG. 11.

Figure 18:
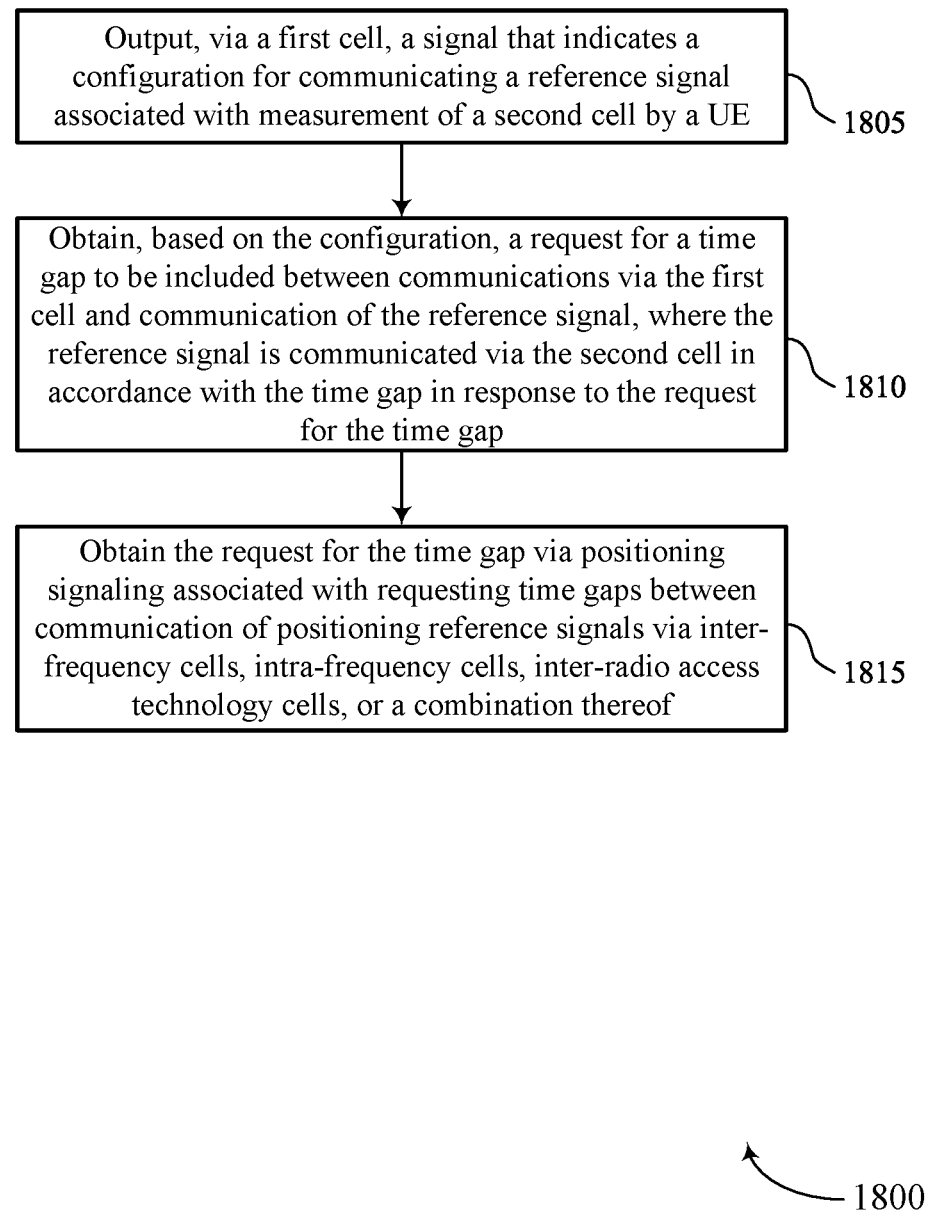

FIG. 18 illustrates a flowchart illustrating a method 1800 that supports techniques for requesting reference signal measurement gaps in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include outputting, via a first cell, a signal that indicates a configuration for communicating a reference signal associated with measurement of a second cell by a UE. The operations of 1805 may be performed in accordance with examples as disclosed herein. In some examples, aspects of the operations of 1805 may be performed by a time gap component 1130 as described with reference to FIG. 11.

At 1810, the method may include obtaining, based on the configuration, a request for a time gap to be included between communications via the first cell and communication of the reference signal, where the reference signal is communicated via the second cell in accordance with the time gap in response to the request for the time gap. The operations of 1810 may be performed in accordance with examples as disclosed herein. In some examples, aspects of the operations of 1810 may be performed by a time gap component 1130 as described with reference to FIG. 11.

At 1815, to support obtaining the request for the time gap, the method may include obtaining the request for the time gap via positioning signaling associated with requesting time gaps between communication of PRSs via inter-frequency cells, intra-frequency cells, inter-RAT cells, or a combination thereof. The operations of 1815 may be performed in accordance with examples as disclosed herein. In some examples, aspects of the operations of 1815 may be performed by a configuration component 1125 as described with reference to FIG. 11.

Figure 19:
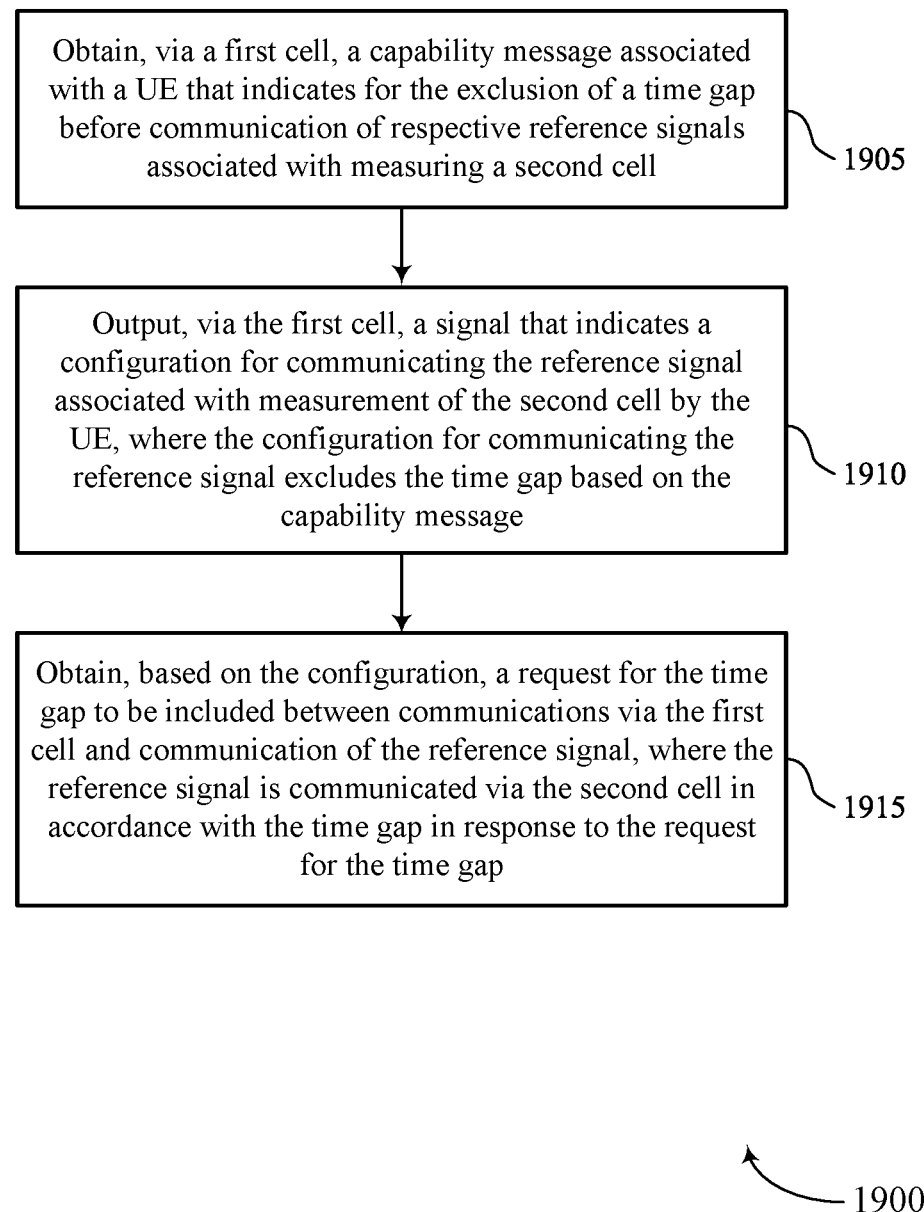

FIG. 19 illustrates a flowchart illustrating a method 1900 that supports techniques for requesting reference signal measurement gaps in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include obtaining, via a first cell, a capability message associated with a UE that indicates for the exclusion of a time gap before communication of respective reference signals associated with measuring a second cell. The operations of 1905 may be performed in accordance with examples as disclosed herein. In some examples, aspects of the operations of 1905 may be performed by a capability component 1135 as described with reference to FIG. 11.

At 1910, the method may include outputting, via the first cell, a signal that indicates a configuration for communicating a reference signal associated with measurement of the second cell by a UE, where the configuration for communicating the reference signal excludes the time gap based on the capability message. The operations of 1910 may be performed in accordance with examples as disclosed herein. In some examples, aspects of the operations of 1910 may be performed by a time gap component 1130 as described with reference to FIG. 11.

At 1915, the method may include obtaining, based on the configuration, a request for the time gap to be included between communications via the first cell and communication of the reference signal, where the reference signal is communicated via the second cell in accordance with the time gap in response to the request for the time gap. The operations of 1915 may be performed in accordance with examples as disclosed herein. In some examples, aspects of the operations of 1915 may be performed by a configuration component 1125 as described with reference to FIG. 11.

Figure 20:
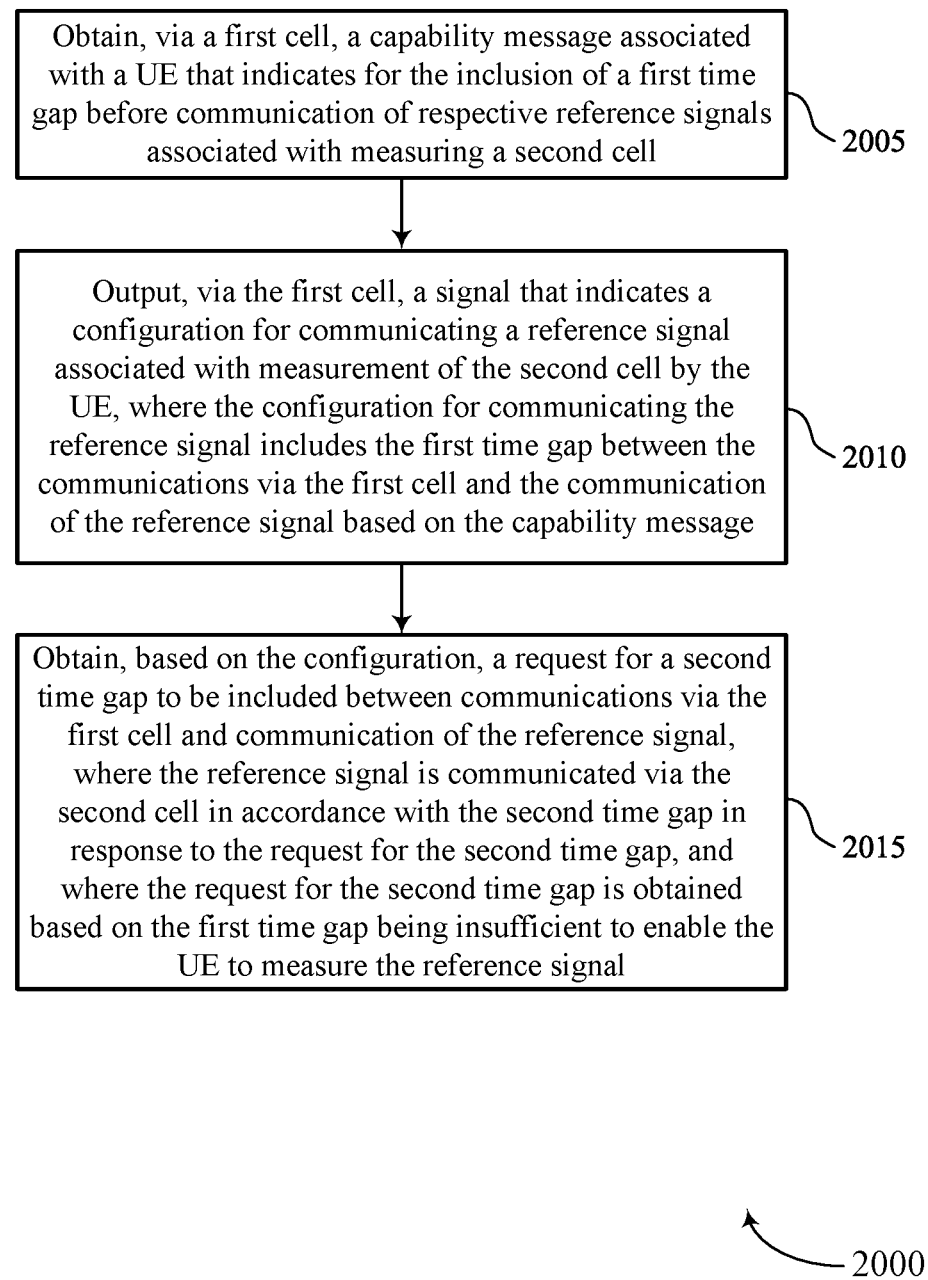

FIG. 20 illustrates a flowchart illustrating a method 2000 that supports techniques for requesting reference signal measurement gaps in accordance with one or more aspects of the present disclosure. The operations of the method 2000 may be implemented by a network entity or its components as described herein. For example, the operations of the method 2000 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 2005, the method may include obtaining, via a first cell, a capability message associated with a UE that indicates for the inclusion of a first time gap before communication of respective reference signals associated with measuring a second cell. The operations of 2005 may be performed in accordance with examples as disclosed herein. In some examples, aspects of the operations of 2005 may be performed by a capability component 1135 as described with reference to FIG. 11.

At 2010, the method may include outputting, via the first cell, a signal that indicates a configuration for communicating a reference signal associated with measurement of the second cell by a UE, where the configuration for communicating the reference signal includes the first time gap between the communications via the first cell and the communication of the reference signal based on the capability message. The operations of 2010 may be performed in accordance with examples as disclosed herein. In some examples, aspects of the operations of 2010 may be performed by a time gap component 1130 as described with reference to FIG. 11.

At 2015, the method may include obtaining, based on the configuration, a request for a second time gap to be included between communications via the first cell and communication of the reference signal, where the reference signal is communicated via the second cell in accordance with the second time gap in response to the request for the second time gap, and where the request for the second time gap is obtained based on the first time gap being insufficient to enable the UE to measure the reference signal. The operations of 2015 may be performed in accordance with examples as disclosed herein. In some examples, aspects of the operations of 2015 may be performed by a configuration component 1125 as described with reference to FIG. 11.

The following provides an overview of aspects of the present disclosure:

Aspect 1: A method for wireless communication at a UE, comprising: receiving, from a network entity via a first cell, signaling that indicates a configuration for communicating a reference signal associated with measuring a second cell; transmitting, to the network entity and based at least in part on the configuration, a request for a time gap to be included between communications via the first cell and communication of the reference signal; and receiving, via the second cell and in response to the request for the time gap, the reference signal in accordance with the time gap.

Aspect 2: The method of aspect 1, wherein transmitting the request for the time gap comprises: transmitting the request for the time gap via positioning signaling associated with requesting time gaps between communication of positioning reference signals via inter-frequency cells, intra-frequency cells, inter-RAT cells, or a combination thereof.

Aspect 3: The method of any of aspects 1 through 2, further comprising: transmitting, to the network entity via the first cell, a capability message indicating for the exclusion of a respective time gap before communication of respective reference signals associated with measuring the second cell, wherein the configuration for communicating the reference signal excludes a configuration for the time gap based at least in part on the capability message.

Aspect 4: The method of aspect 3, further comprising: determining to request the inclusion of the time gap based at least in part on one or more timing parameters included in the configuration for communicating the reference signal, wherein the request for the time gap is transmitted based at least in part on the determination and the exclusion of the configuration for the time gap.

Aspect 5: The method of any of aspects 1 through 2, further comprising: transmitting, to the network entity via the first cell, a capability message indicating for the inclusion of a respective time gap before communication of respective reference signals associated with measuring the second cell, wherein the configuration for communicating the reference signal includes a configuration for a second time gap between the communications via the first cell and the communication of the reference signal based at least in part on the capability message; and determining that the second time gap is insufficient to enable the UE to measure the reference signal, wherein the request for the time gap is transmitted based at least in part on the determination.

Aspect 6: The method of aspect 5, wherein the time gap is included between the communications via the first cell and the communication of the reference signal in addition to the second time gap, or the time gap is included between the communications via the first cell and the communication of the reference signal instead of the second time gap.

Aspect 7: The method of any of aspects 1 through 6, further comprising: tuning, during the time gap, an RF chain of the UE from a first frequency associated with the first cell to a second frequency associated with the second cell, from a first RAT associated with the first cell to a second RAT associated with the second cell, or both, wherein the reference signal is received via the second cell based at least in part on the tuning.

Aspect 8: The method of any of aspects 1 through 7, wherein the request for the time gap includes a duration of the time gap, a periodicity of the time gap, a time offset relative to a starting slot of a transmission time interval via which the reference signal is received, or a combination thereof.

Aspect 9: The method of aspect 8, further comprising: receiving, via the second cell and based at least in part on the periodicity of the time gap, a second reference signal associated with measuring the second cell in accordance with the time gap.

Aspect 10: The method of any of aspects 1 through 9, wherein the request for the time gap indicates a periodicity of the time gap for inclusion between subsequent communications via the first cell and communication of subsequent reference signals associated with measuring the second cell, the method further comprising: transmitting, to the network entity via the first cell, a second request to disable the inclusion of the time gap in accordance with the indicated periodicity.

Aspect 11: The method of any of aspects 1 through 10, further comprising: determining that the network entity supports a positioning procedure associated with the UE, wherein the request for the time gap is transmitted to the network entity based at least in part on the determination.

Aspect 12: The method of any of aspects 1 through 2 and 5 through 11, wherein the configuration for communicating the reference signal comprises a configuration of a second time gap, and the request for the time gap is transmitted based at least in part on a duration of the second time gap being greater than a duration for the UE to tune an RF chain from the first cell to the second cell, a duration of the time gap being less than the duration of the second time gap.

Aspect 13: The method of any of aspects 1 through 12, wherein the first cell is associated with a first frequency and the second cell is associated with a second frequency, and the request for the time gap is transmitted based at least in part on the first frequency and the second frequency being different.

Aspect 14: The method of any of aspects 1 through 13, wherein the first cell is associated with a first RAT and the second cell is associated with a second RAT, and the request for the time gap is transmitted based at least in part on the first RAT and the second RAT being different.

Aspect 15: A method for wireless communication at a network entity, comprising: outputting, via a first cell, signaling that indicates a configuration for communicating a reference signal associated with measurement of a second cell by a UE; and obtaining, based at least in part on the configuration, a request for a time gap to be included between communications via the first cell and communication of the reference signal, wherein the reference signal is communicated via the second cell in accordance with the time gap in response to the request for the time gap.

Aspect 16: The method of aspect 15, wherein obtaining the request for the time gap comprises: obtaining the request for the time gap via positioning signaling associated with requesting time gaps between communication of positioning reference signals via inter-frequency cells, intra-frequency cells, inter-RAT cells, or a combination thereof.

Aspect 17: The method of any of aspects 15 through 16, further comprising: obtaining, via the first cell, a capability message associated with the UE that indicates for the exclusion of a respective time gap before communication of respective reference signals associated with measuring the second cell, wherein the configuration for communicating the reference signal excludes a configuration for the time gap based at least in part on the capability message.

Aspect 18: The method of aspect 17, wherein the request for the time gap is obtained based at least in part on one or more timing parameters included in the configuration for communicating the reference signal and the exclusion of the configuration for the time gap.

Aspect 19: The method of any of aspects 15 through 16, further comprising: obtaining, via the first cell, a capability message associated with the UE that indicates for the inclusion of a respective time gap before communication of respective reference signals associated with measuring the second cell, wherein the configuration for communicating the reference signal includes a configuration for a second time gap between the communications via the first cell and the communication of the reference signal based at least in part on the capability message, and wherein the request for the time gap is obtained based at least in part on the second time gap being insufficient to enable the UE to measure the reference signal.

Aspect 20: The method of aspect 19, wherein the time gap is included between the communications via the first cell and the communication of the reference signal in addition to the second time gap, or the time gap is included between the communications via the first cell and the communication of the reference signal instead of the second time gap.

Aspect 21: The method of any of aspects 15 through 20, wherein the request for the time gap includes a duration of the time gap, a periodicity of the time gap, a time offset relative to a starting slot of a transmission time interval via which the reference signal is output, or a combination thereof.

Aspect 22: The method of any of aspects 15 through 21, wherein the request for the time gap indicates a periodicity of the time gap for inclusion between subsequent communications via the first cell and communication of subsequent reference signals associated with measuring the second cell, the method further comprising: obtaining, via the first cell, a second request to disable the inclusion of the time gap in accordance with the indicated periodicity.

Aspect 23: The method of any of aspects 15 through 22, wherein the request for the time gap is obtained based at least in part on the network entity supporting a positioning procedure associated with the UE.

Aspect 24: The method of any of aspects 15 through 16 and 19 through 23, wherein the configuration for communicating the reference signal comprises a configuration of a second time gap, and the request for the time gap is obtained based at least in part on a duration of the second time gap being greater than a duration for the UE to tune an RF chain from the first cell to the second cell, a duration of the time gap being less than the duration of the second time gap.

Aspect 25: The method of any of aspects 15 through 24, wherein the first cell is associated with a first frequency and the second cell is associated with a second frequency, and the request for the time gap is obtained based at least in part on the first frequency and the second frequency being different.

Aspect 26: The method of any of aspects 15 through 25, wherein the first cell is associated with a first RAT and the second cell is associated with a second RAT, and the request for the time gap is obtained based at least in part on the first RAT and the second RAT being different.

Aspect 27: An apparatus for wireless communication at a UE, comprising a processor; and a memory coupled with the processor, wherein the memory comprises instructions executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a network entity, comprising a processor; and a memory coupled with the processor, wherein the memory comprises instructions executable by the processor to cause the apparatus to perform a method of any of aspects 15 through 26.

Aspect 31: An apparatus for wireless communication at a network entity, comprising at least one means for performing a method of any of aspects 15 through 26.

Aspect 32: A non-transitory computer-readable medium storing code for wireless communication at a network entity, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor; and
a memory coupled with the processor, wherein the memory comprises instructions executable by the processor to cause the apparatus to:
transmit, to a network entity via a first cell, a capability message indicating for the exclusion of a respective time gap before communication of respective reference signals associated with measuring a second cell;
receive, from the network entity via the first cell, signaling that indicates a configuration for communicating a reference signal associated with measuring the second cell, wherein the configuration for communicating the reference signal excludes a configuration for the time gap based at least in part on the capability message;
transmit, to the network entity and based at least in part on the configuration, a request for a time gap to be included between communications via the first cell and communication of the reference signal; and
receive, via the second cell and in response to the request for the time gap, the reference signal in accordance with the time gap.

2. The apparatus of claim 1, wherein the instructions to transmit the request for the time gap are executable by the processor to cause the apparatus to:
transmit the request for the time gap via positioning signaling associated with requesting time gaps between communication of positioning reference signals via inter-frequency cells, intra-frequency cells, inter-radio access technology cells, or a combination thereof.

3. The apparatus of claim 1, wherein the instructions are further executable by the processor to cause the apparatus to:
determine to request the inclusion of the time gap based at least in part on one or more timing parameters included in the configuration for communicating the reference signal, wherein the request for the time gap is transmitted based at least in part on the determination and the exclusion of the configuration for the time gap.

4. The apparatus of claim 1, wherein the instructions are further executable by the processor to cause the apparatus to:
tune, during the time gap, a radio frequency chain of the UE from a first frequency associated with the first cell to a second frequency associated with the second cell, from a first radio access technology associated with the first cell to a second radio access technology associated with the second cell, or both, wherein the reference signal is received via the second cell based at least in part on the tuning.

5. The apparatus of claim 1, wherein the request for the time gap includes a duration of the time gap, a periodicity of the time gap, a time offset relative to a starting slot of a transmission time interval via which the reference signal is received, or a combination thereof.

6. The apparatus of claim 5, wherein the instructions are further executable by the processor to cause the apparatus to:
receive, via the second cell and based at least in part on the periodicity of the time gap, a second reference signal associated with measuring the second cell in accordance with the time gap.

7. The apparatus of claim 1, wherein the request for the time gap indicates a periodicity of the time gap for inclusion between subsequent communications via the first cell and communication of subsequent reference signals associated with measuring the second cell, and the instructions are further executable by the processor to cause the apparatus to:
transmit, to the network entity via the first cell, a second request to disable the inclusion of the time gap in accordance with the indicated periodicity.

8. The apparatus of claim 1, wherein the instructions are further executable by the processor to cause the apparatus to:
determine that the network entity supports a positioning procedure associated with the UE, wherein the request for the time gap is transmitted to the network entity based at least in part on the determination.

9. The apparatus of claim 1, wherein:
the configuration for communicating the reference signal comprises a configuration of a second time gap, and
the request for the time gap is transmitted based at least in part on a duration of the second time gap being greater than a duration for the UE to tune a radio frequency chain from the first cell to the second cell, a duration of the time gap being less than the duration of the second time gap.

10. The apparatus of claim 1, wherein:
the first cell is associated with a first frequency and the second cell is associated with a second frequency, and
the request for the time gap is transmitted based at least in part on the first frequency and the second frequency being different.

11. The apparatus of claim 1, wherein:
the first cell is associated with a first radio access technology and the second cell is associated with a second radio access technology, and
the request for the time gap is transmitted based at least in part on the first radio access technology and the second radio access technology being different.

12. An apparatus for wireless communication at a network entity, comprising:
a processor; and
a memory coupled with the processor, wherein the memory comprises instructions executable by the processor to cause the apparatus to:
obtain, via a first cell, a capability message associated with a user equipment (UE) that indicates for the exclusion of a respective time gap before communication of respective reference signals associated with measuring a second cell by the UE;
output, via the first cell, signaling that indicates a configuration for communicating a reference signal associated with measurement of the second cell by the UE, wherein the configuration for communicating the reference signal excludes a configuration for the time gap based at least in part on the capability message; and
obtain, based at least in part on the configuration, a request for a time gap to be included between communications via the first cell and communication of the reference signal, wherein the reference signal is communicated via the second cell in accordance with the time gap in response to the request for the time gap.

13. The apparatus of claim 12, wherein the instructions to obtain the request for the time gap are executable by the processor to cause the apparatus to:
obtain the request for the time gap via positioning signaling associated with requesting time gaps between communication of positioning reference signals via inter-frequency cells, intra-frequency cells, inter-radio access technology cells, or a combination thereof.

14. The apparatus of claim 12, wherein the request for the time gap is obtained based at least in part on one or more timing parameters included in the configuration for communicating the reference signal and the exclusion of the configuration for the time gap.

15. The apparatus of claim 12, wherein the request for the time gap includes a duration of the time gap, a periodicity of the time gap, a time offset relative to a starting slot of a transmission time interval via which the reference signal is output, or a combination thereof.

16. The apparatus of claim 12, wherein the request for the time gap indicates a periodicity of the time gap for inclusion between subsequent communications via the first cell and communication of subsequent reference signals associated with measuring the second cell, and the instructions are further executable by the processor to cause the apparatus to:
obtain, via the first cell, a second request to disable the inclusion of the time gap in accordance with the indicated periodicity.

17. The apparatus of claim 12, wherein the request for the time gap is obtained based at least in part on the network entity supporting a positioning procedure associated with the UE.

18. The apparatus of claim 12, wherein:
the configuration for communicating the reference signal comprises a configuration of a second time gap, and
the request for the time gap is obtained based at least in part on a duration of the second time gap being greater than a duration for the UE to tune a radio frequency chain from the first cell to the second cell, a duration of the time gap being less than the duration of the second time gap.

19. The apparatus of claim 12, wherein:
the first cell is associated with a first frequency and the second cell is associated with a second frequency, and
the request for the time gap is obtained based at least in part on the first frequency and the second frequency being different.

20. The apparatus of claim 12, wherein:
the first cell is associated with a first radio access technology and the second cell is associated with a second radio access technology, and
the request for the time gap is obtained based at least in part on the first radio access technology and the second radio access technology being different.

21. A method for wireless communication at a user equipment (UE), comprising:
transmitting, to a network entity via a first cell, a capability message indicating for the exclusion of a respective time gap before communication of respective reference signals associated with measuring a second cell;
receiving, from the network entity via the first cell, signaling that indicates a configuration for communicating a reference signal associated with measuring the second cell, wherein the configuration for communicating the reference signal excludes a configuration for the time gap based at least in part on the capability message;
transmitting, to the network entity and based at least in part on the configuration, a request for a time gap to be included between communications via the first cell and communication of the reference signal; and
receiving, via the second cell and in response to the request for the time gap, the reference signal in accordance with the time gap.

22. The method of claim 21, wherein transmitting the request for the time gap comprises:
transmitting the request for the time gap via positioning signaling associated with requesting time gaps between communication of positioning reference signals via inter-frequency cells, intra-frequency cells, inter-radio access technology cells, or a combination thereof.

23. A method for wireless communication at a network entity, comprising:
obtain, via a first cell, a capability message associated with a user equipment (UE) that indicates for the exclusion of a respective time gap before communication of respective reference signals associated with measuring a second cell by the UE;
outputting, via the first cell, signaling that indicates a configuration for communicating a reference signal associated with measurement of the second cell by the UE, wherein the configuration for communicating the reference signal excludes a configuration for the time gap based at least in part on the capability message; and obtaining, based at least in part on the configuration, a request for a time gap to be included between communications via the first cell and communication of the reference signal, wherein the reference signal is communicated via the second cell in accordance with the time gap in response to the request for the time gap.

24. The method of claim 23, wherein obtaining the request for the time gap comprises:

obtaining the request for the time gap via positioning signaling associated with requesting time gaps between communication of positioning reference signals via inter-frequency cells, intra-frequency cells, inter-radio access technology cells, or a combination thereof.

* * * * *